US012204267B2

(12) United States Patent
Agata et al.

(10) Patent No.: US 12,204,267 B2
(45) Date of Patent: Jan. 21, 2025

(54) SHEET PROCESSING APPARATUS AND IMAGE FORMING SYSTEM

(71) Applicant: CANON KABUSHIKI KAISHA, Tokyo (JP)

(72) Inventors: Jun Agata, Suntou-gun (JP); Hiroharu Tsuji, Numazu (JP); Masayoshi Fukatsu, Suntou-gun (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/739,335

(22) Filed: May 9, 2022

(65) Prior Publication Data

US 2022/0269212 A1 Aug. 25, 2022

Related U.S. Application Data

(63) Continuation of application No. 16/879,841, filed on May 21, 2020, now Pat. No. 11,353,817.

(30) Foreign Application Priority Data

May 31, 2019 (JP) ................................ 2019-102796
Dec. 12, 2019 (JP) ................................ 2019-224719
Mar. 23, 2020 (JP) ................................ 2020-051914

(51) Int. Cl.
*B65H 31/36* (2006.01)
*G03G 15/00* (2006.01)

(52) U.S. Cl.
CPC ......... *G03G 15/6582* (2013.01); *B65H 31/36* (2013.01)

(58) Field of Classification Search
CPC ........... G03G 15/6573; G03G 15/6582; B65H 2220/02; B65H 2511/51; B65H 2513/51;
(Continued)

(56) References Cited

U.S. PATENT DOCUMENTS 6,305,681 B1 * 10/2001 Watanabe .............. B65H 37/04 270/58.08
6,574,011 B1 6/2003 Sato et al.
(Continued)

FOREIGN PATENT DOCUMENTS

CN 106185429 A 12/2016
JP H08-310717 A 11/1996
(Continued)

OTHER PUBLICATIONS

Chinese Office Action dated Jul. 11, 2022, in related Chinese Patent Application No. 202010453169.8 (with English translation).
(Continued)

*Primary Examiner* — Jennifer Bahls
(74) *Attorney, Agent, or Firm* — VENABLE LLP

(57) ABSTRACT

A sheet processing includes a first conveyance path, a buffering portion, a second conveyance path, a conveyance roller pair, a supporting portion, a moving member, a regulating portion, and a processing unit. The buffering portion is configured to superimpose a first sheet and a second sheet on each other in a state of being offset from each other in a sheet conveyance direction. An offset amount, by which a leading end of the first sheet in the sheet conveyance direction projects downstream in the sheet conveyance direction with respect to a leading end of the second sheet in the sheet conveyance direction in a state before the first sheet and the second sheet are discharged onto the supporting portion, is larger than a distance from a sheet contact position of the moving member to the regulating portion in the sheet conveyance direction.

11 Claims, 23 Drawing Sheets

(58) Field of Classification Search
CPC .. B65H 2220/01; B65H 31/309; B65H 31/36; B65H 31/02; B65H 2513/57
See application file for complete search history.

(56) References Cited

U.S. PATENT DOCUMENTS

| | | | | |
|---|---|---|---|---|
| 8,235,375 | B2 | 8/2012 | Shiraishi | |
| 8,262,075 | B2 | 9/2012 | Shiraishi | |
| 8,613,435 | B2 | 12/2013 | Kato et al. | |
| 8,668,198 | B2 | 3/2014 | Tsuji et al. | |
| 9,446,923 | B2 | 9/2016 | Yoshida et al. | |
| 9,495,622 | B2 | 11/2016 | Osada et al. | |
| 9,758,335 | B2 | 9/2017 | Taki | |
| 10,252,876 | B2 | 4/2019 | Taki | |
| 10,358,312 | B2 | 7/2019 | Okawa et al. | |
| 2006/0208411 | A1* | 9/2006 | Saito | B65H 31/36 270/58.07 |
| 2009/0127764 | A1 | 5/2009 | Kamiya | |
| 2009/0261521 | A1* | 10/2009 | Okamoto | B65H 37/04 270/37 |
| 2011/0140348 | A1 | 6/2011 | Urano et al. | |
| 2011/0233844 | A1 | 9/2011 | Shiraishi et al. | |
| 2012/0126477 | A1* | 5/2012 | Shimakawa | G03G 15/6582 271/232 |
| 2013/0082436 | A1 | 4/2013 | Gamo | |
| 2013/0108344 | A1* | 5/2013 | Kimura | G03G 15/6541 399/407 |
| 2014/0054854 | A1 | 2/2014 | Kushida | |
| 2014/0284875 | A1 | 9/2014 | Ochi et al. | |
| 2015/0310316 | A1 | 10/2015 | Osada et al. | |
| 2019/0300321 | A1 | 10/2019 | Okawa et al. | |

FOREIGN PATENT DOCUMENTS

| | | | |
|---|---|---|---|
| JP | 2000-086071 | A | 3/2000 |
| JP | 2004299811 | A | * 10/2004 |
| JP | 2008-007303 | A | 1/2008 |
| JP | 2008-213972 | A | 9/2008 |
| JP | 2009-078896 | A | 4/2009 |
| JP | 2009-274839 | A | 11/2009 |
| JP | 2011-207564 | A | 10/2011 |
| JP | 2011-209460 | A | 10/2011 |
| JP | 2013-252909 | A | 12/2013 |
| JP | 2014-177330 | A | 9/2014 |
| JP | 2015-117075 | A | 6/2015 |
| JP | 2015-209281 | A | 11/2015 |
| JP | 2018-065668 | A | 4/2018 |

OTHER PUBLICATIONS

Chinese Office Action dated Mar. 23, 2023, in related Chinese Patent Application No. 202010453169.8 (with English translation).
Japanese Office Action dated Feb. 6, 2024, in related Japanese Patent Application No. 2020-051914.

* cited by examiner

SHEET PROCESSING APPARATUS AND IMAGE FORMING SYSTEM

This application is a continuation of application Ser. No. 16/879,841, filed May 21, 2020.

BACKGROUND OF THE INVENTION

Field of the Invention

The present invention relates to a sheet processing apparatus that processes a sheet, and an image forming system that forms an image on a sheet.

Description of the Related Art

As an optional function of an image forming apparatus, for example, an electrophotographic multi-functional apparatus, a sheet processing apparatus that performs a process such as a binding process or a sorting process on sheets on which images have been formed by the image forming apparatus is known. Japanese Patent Laid-Open No. 2015-117075 discloses a post-processing apparatus that, after discharging a sheet onto a process tray by sheet discharge rollers provided above the process tray, moves the sheet by using a paddle and a belt to cause the sheet to abut an end regulating member serving as the standard for a sheet position. These paddle and belt are rotary members that come into contact with the upper surface of the sheet, and moves the sheet in a direction approximately opposite to the sheet discharge direction of the sheet discharge rollers.

When aligning sheets by a rotary member that comes into contact with only the upper surface of a sheet like the paddle and the belt described above, it is sometimes difficult to maintain the alignment precision and reduce jams at the same time. That is, when a conveyance force a rotary member applies to the sheet is too small, sometimes the sheet cannot reach the end regulating member and is displaced from a standard position of the alignment operation. In contrast, in the case where the conveyance force that the rotary member applies to the sheet is too large, a state in which the sheet is crumpled between the rotary member and the end regulating member and a normal process cannot be performed is likely to occur. This state is also referred to as a jam state.

SUMMARY OF THE INVENTION

The present invention provides sheet processing apparatus and image forming system which can reduce occurrence of a jam while maintaining alignment precision.

According to one aspect of the invention, a sheet processing apparatus includes: a first conveyance path configured to receive a sheet; a buffering portion configured to perform a buffering operation by superimposing a plurality of sheets received through the first conveyance path on each other; a second conveyance path through which the plurality of sheets superimposed by the buffering portion are conveyed; a conveyance roller pair disposed in the second conveyance path and configured to nip a sheet conveyed to the conveyance roller pair through the second conveyance path in a sheet conveyance direction and convey the nipped sheet in the sheet conveyance direction; a supporting portion which is provided downstream of the conveyance roller pair in the sheet conveyance direction and on which a sheet discharged by the conveyance roller pair is supported; a moving member provided downstream of the conveyance roller pair in the sheet conveyance direction and configured to come into contact with an upper surface of a sheet discharged from the second conveyance path onto the supporting portion and move the contacted sheet downstream in the sheet conveyance direction; a regulating portion disposed downstream of a sheet contact position of the moving member in the sheet conveyance direction and configured to abut a leading end of the sheet supported on the supporting portion in the sheet conveyance direction to regulate a sheet position; and a processing unit configured to perform a process on the sheet supported on the supporting portion and whose sheet position has been regulated by the regulating portion, wherein the buffering portion is configured to superimpose a first sheet and a second sheet among the plurality of sheets on each other in a state of being offset from each other in the sheet conveyance direction, the second sheet being a sheet to be superimposed on the first sheet in a state where the plurality of sheets are supported on the supporting portion, and wherein an offset amount, by which a leading end of the first sheet in the sheet conveyance direction projects downstream in the sheet conveyance direction with respect to a leading end of the second sheet in the sheet conveyance direction in a state before the first sheet and the second sheet are discharged onto the supporting portion, is larger than a distance from the sheet contact position of the moving member to the regulating portion in the sheet conveyance direction.

According to another aspect of the invention, a sheet processing apparatus includes: a first conveyance path configured to receive a sheet; a second conveyance path configured to receive the sheet from the first conveyance path; a conveyance roller pair disposed in the second conveyance path and configured to nip and convey the sheet; a supporting portion on which the sheet discharged from the second conveyance path by the conveyance roller pair is supported; a regulating portion configured to come into contact with the sheet supported on the supporting portion and regulate a sheet position; a processing unit configured to perform a process on the sheet supported on the supporting portion and move in a direction following a sheet conveyance direction of the conveyance roller pair; and a discharge portion through which the sheet discharged from the supporting portion in a discharge direction pass and which is positioned downstream of a movement region of the processing unit in the discharge direction.

According to still another aspect of the invention, a sheet processing apparatus includes: a first conveyance path configured to receive a sheet; a reverse conveyance unit configured to reverse the sheet received from the first conveyance path; a second conveyance path extending below the first conveyance path and configured to receive the sheet reversed by the reverse conveyance unit; a conveyance roller pair disposed in the second conveyance path and configured to nip and convey the sheet; a supporting portion on which the sheet discharged from the second conveyance path by the conveyance roller pair is supported; a moving member provided downstream of the conveyance roller pair in a sheet conveyance direction of the conveyance roller pair and configured to come into contact with an upper surface of the sheet discharged from the second conveyance path onto the supporting portion and move the sheet downstream in the sheet conveyance direction; a regulating portion disposed downstream of a sheet contact position of the moving member in the sheet conveyance direction and configured to abut a leading end of the sheet supported on the supporting portion in the sheet conveyance direction to regulate a sheet position; a processing unit configured to perform a process on the sheet supported on the supporting portion; a pushing member configured to abut a leading end of the sheet processed by the processing unit in the sheet conveyance direction and push the sheet in a discharge direction of the supporting portion opposite to the sheet conveyance direction; a third conveyance path extending from the supporting portion to a downstream side in the discharge direction; and a discharge unit disposed in the third conveyance path and configured to discharge the sheet pushed out of the supporting portion by the pushing member to an outside of the sheet processing apparatus.

Further features of the present invention will become apparent from the following description of exemplary embodiments with reference to the attached drawings.

DESCRIPTION OF THE EMBODIMENTS

Exemplary embodiments of the present invention will be described below with reference to drawings.

First Exemplary Embodiment

Figure 1:
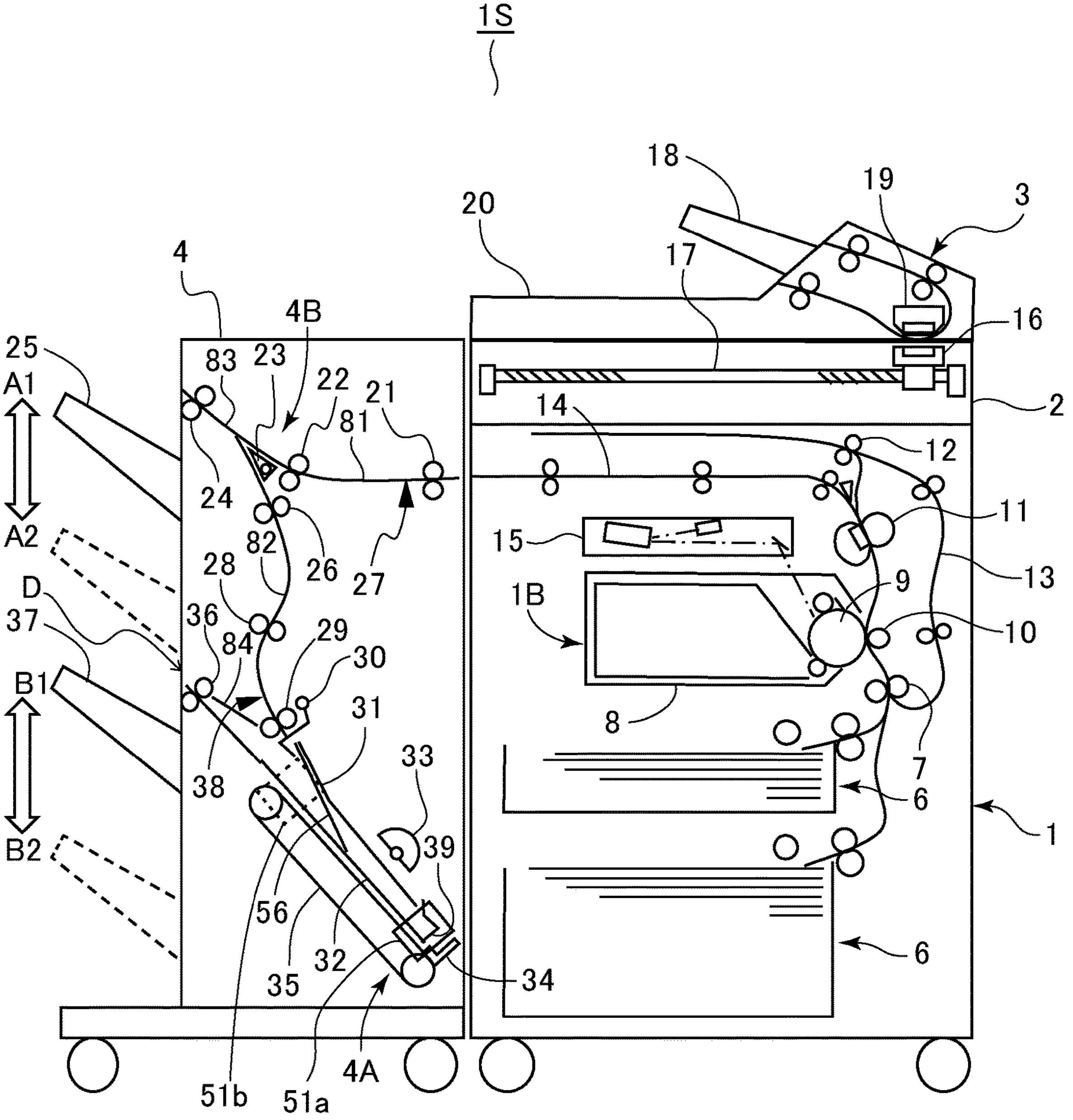
FIG. 1 is a schematic view of an image forming system according to a first exemplary embodiment.

FIG. 1 is a schematic view of an image forming system 1S according to a first exemplary embodiment. The image forming system 1S of the present exemplary embodiment includes an image forming apparatus 1, an image reading apparatus 2, a document feeding apparatus 3, and a post-processing apparatus 4. The image forming system 1S forms an image on a sheet serving as a recording material, and outputs the sheet after processing the sheet by the post-processing apparatus 4 if necessary. Hereinafter, simple description of the operation of each apparatus will be given, and then the post-processing apparatus 4 will be described in detail.

The document feeding apparatus 3 conveys a document placed on a document tray 18 to image reading portions 16 and 19. The image reading portions 16 and 19 are image sensors that read image information from respective document surfaces, and both surfaces of a document are read in one time of conveyance of the document. The document whose image information has been read is discharged onto a document discharge portion 20. In addition, the image reading apparatus 2 can read image information from a still document set on a platen glass, by reciprocating the image reading portion 16 by a driving device 17. Examples of the still document include documents such as booklet documents for which the document feeding apparatus 3 cannot be used.

The image forming apparatus 1 is an electrophotographic apparatus including an image forming portion 1B of a direct transfer system. The image forming portion 1B includes a cartridge 8 including a photosensitive drum 9, and a laser scanner unit 15 disposed above the cartridge 8. In the case of performing an image forming operation, the surface of the rotating photosensitive drum 9 is charged, and the laser scanner unit 15 draws an electrostatic latent image on the surface of the photosensitive drum 9 by exposing the photosensitive drum 9 on the basis of image information. The electrostatic latent image born on the photosensitive drum 9 is developed into a toner image by charged toner particles, and the toner image is transferred to a transfer portion where the photosensitive drum 9 and a transfer roller 10 face each other. The controller of the image forming apparatus 1, which is a printer controller 100 that will be described later, executes an image forming operation by the image forming portion 1B on the basis of image information read by the image reading portions 16 and 19 or image information received from an external computer via a network.

The image forming apparatus 1 includes a plurality of feeding apparatuses 6 that feed sheets serving as recording materials one by one at a predetermined interval. A sheet fed from a feeding apparatus 6 is conveyed to the transfer portion after the skew thereof is corrected by registration rollers 7, and in the transfer portion, the toner image born on the photosensitive drum 9 is transferred thereto. A fixing unit 11 is disposed downstream of the transfer portion in a conveyance direction of the sheet. The fixing unit 11 includes a rotary member pair that nips and conveys the sheet, and a heat generating member such as a halogen lamp for heating the toner image, and performs image fixing processing on the toner image on the sheet by heating and pressurizing the toner image.

In the case of discharging the sheet having undergone image formation to the outside of the image forming apparatus 1, the sheet having passed through the fixing unit 11 is conveyed to the post-processing apparatus 4 via a horizontal conveyance portion 14. In the case of a sheet image formation on a first surface of which is finished in duplex printing, the sheet having passed through the fixing unit 11 is passed onto reverse conveyance rollers 12, switched back and conveyed by the reverse conveyance rollers 12, and conveyed to the registration rollers 7 again via a reconveyance portion 13. Then, an image is formed on a second surface of the sheet as a result of the sheet passing through the transfer portion and the fixing unit 11 again, and then the sheet is conveyed to the post-processing apparatus 4 via the horizontal conveyance portion 14.

The image forming portion 1B described above is an example of an image forming portion that forms an image on a sheet, and an electrophotographic unit of an intermediate transfer system that transfers a toner image formed on a photosensitive member onto a sheet via an intermediate transfer member may be used therefor. In addition, a printing unit of an inkjet system or an offset printing system may be used as the image forming portion.

Post-Processing Apparatus

The post-processing apparatus 4 includes a binding processing portion 4A that performs a binding process on sheets received from the image forming apparatus 1, and discharges the sheets as a sheet bundle. In addition, the post-processing apparatus 4 is also capable of simply discharging a sheet received from the image forming apparatus 1 without performing a binding process thereon.

The post-processing apparatus 4 includes an entry path 81, an in-body discharge path 82, a first discharge path 83, and a second discharge path 84 as a conveyance path for conveying a sheet, and an upper discharge tray 25 and a lower discharge tray 37 are provided as discharge destinations onto which a sheet is discharged. The entry path 81 serves as a first conveyance path of the present exemplary embodiment through which a sheet is received from the image forming apparatus 1 and conveyed, and the in-body discharge path 82 serves as a second conveyance path of the present exemplary embodiment through which the sheet is conveyed toward the binding processing portion 4A. The first discharge path 83 is a conveyance path through which the sheet is discharged onto the upper discharge tray 25, and the second discharge path 84 is a conveyance path serving as a third conveyance path through which the sheet is discharged onto the lower discharge tray 37.

In the entry path 81, inlet rollers 21, pre-buffer rollers 22, and an entrance sensor 27 are disposed. In the first discharge path 83, the reverse conveyance rollers 24 serving as a reverse conveyance unit is disposed. In the in-body discharge path 82, in-body discharge rollers 26, intermediate conveyance rollers 28, kick-out rollers 29, and a pre-intermediate supporting sensor 38 are disposed. In the second discharge path 84, bundle discharge rollers 36 are disposed. The entrance sensor 27 and the pre-intermediate supporting sensor 38 each serve as an example of a sheet detection portion that detects passage of a sheet at a predetermined detection position in a conveyance path in a sheet processing apparatus. As the entrance sensor 27 and the pre-intermediate supporting sensor 38, optical sensors that detect presence/absence of a sheet at the detection position by using light as will be described later can be used.

A sheet conveyance path in the post-processing apparatus 4 will be described below. To be noted, a buffering operation by a buffering portion 4B including the reverse conveyance rollers 24, and the detailed configuration and operation of the binding processing portion 4A will be described later.

The sheet discharged from the horizontal conveyance portion 14 of the image forming apparatus 1 is received by the inlet rollers 21, and is conveyed toward the pre-buffer rollers 22 through the entry path 81. The entrance sensor 27 detects the sheet at a detection position between the inlet rollers 21 and the pre-buffer rollers 22. The pre-buffer rollers 22 convey the sheet received from the inlet rollers 21 toward the first discharge path 83.

To be noted, at a predetermined timing after the entrance sensor 27 has detected passage of a trailing end of the sheet, the sheet conveyance speed of the pre-buffer rollers 22 is increased to a speed higher than the conveyance speed in the horizontal conveyance portion 14. In addition, the sheet conveyance speed of the inlet rollers 21 may be set to be higher than that in the horizontal conveyance portion 14, and the conveyance speed may be increased by the inlet rollers 21 upstream of the pre-buffer rollers 22. In this case, it is preferable that a one-way clutch is disposed between a conveyance roller of the horizontal conveyance portion 14 and a motor that drives the conveyance roller such that the conveyance roller idles even when the sheet is pulled by the inlet rollers 21.

In the case where the discharge destination of the sheet is the upper discharge tray 25, the reverse conveyance rollers 24 discharge the sheet received from the pre-buffer rollers 22 onto the upper discharge tray 25. In this case, the reverse conveyance rollers 24 decelerate to a predetermined discharge speed at a predetermined timing after the trailing end of the sheet has passed through the pre-buffer rollers 22.

In the case where the discharge destination of the sheet is the lower discharge tray 37, the reverse conveyance rollers 24 switch back and convey the sheet received from the pre-buffer rollers 22 toward the in-body discharge path 82. A non-return flap 23 is provided at a branching portion upstream of the reverse conveyance rollers 24 in the sheet discharge direction of the reverse conveyance rollers 24 where the entry path 81 and the in-body discharge path 82 branch from the first discharge path 83. The non-return flap 23 has a function of suppressing backward movement of the sheet switched back by the reverse conveyance rollers 24 into the entry path 81.

The in-body discharge rollers 26, the intermediate conveyance rollers 28, and the kick-out rollers 29 disposed in the in-body discharge path 82 convey the sheet received from the reverse conveyance rollers 24 toward the binding processing portion 4A while passing the sheet onto one another. The pre-intermediate supporting sensor 38 detects the sheet at a position between the intermediate conveyance rollers 28 and the kick-out rollers 29.

The binding processing portion 4A includes a stapler serving as a binding unit of the present exemplary embodiment, and staples a predetermined position of the sheet bundle by the stapler after aligning a plurality of sheets received from the in-body discharge path 82. The detailed configuration and operation of the binding processing portion 4A will be described later. The sheet bundle stapled by the binding processing portion 4A is passed onto bundle discharge rollers 36 through the second discharge path 84 serving as a third conveyance path, and is discharged onto the lower discharge tray 37 by the bundle discharge rollers 36 serving as a discharge unit. The post-processing apparatus 4 includes a discharge portion D that is an opening portion for discharging the sheets conveyed by the bundle discharge rollers 36 in the discharge direction from the inside to the outside of the apparatus.

The upper discharge tray 25 and the lower discharge tray 37 are both capable of moving up and down with respect to the casing of the post-processing apparatus 4. The post-processing apparatus 4 includes sheet surface detection sensors that respectively detect positions of upper surfaces of sheets, that is, the height of sheets supported on the upper discharge tray 25 and the lower discharge tray 37, and when either of the sensors detects a sheet, lowers the corresponding tray in an A2 or B2 direction. In addition, when it is detected by the sheet surface detection sensors that the sheets on the upper discharge tray 25 or the lower discharge tray 37 have been removed, the corresponding tray is lifted in an A1 or B1 direction. Therefore, the upper discharge tray 25 and the lower discharge tray 37 are controlled to ascend/descend in accordance with a supported sheet amount on each tray so as to maintain the upper surface of supported sheets at a constant height. In the present exemplary embodiment, the upper discharge tray 25 and the lower discharge tray 37, which respectively serve as a first supporting portion and a second supporting portion, are both controlled to ascend/descend by means of motor drive. Note that the upper discharge tray 25 and the lower discharge tray 37 may be controlled to ascend/descend by another mechanism, such as an urging member like a spring.

Buffering Operation

Figure 2:
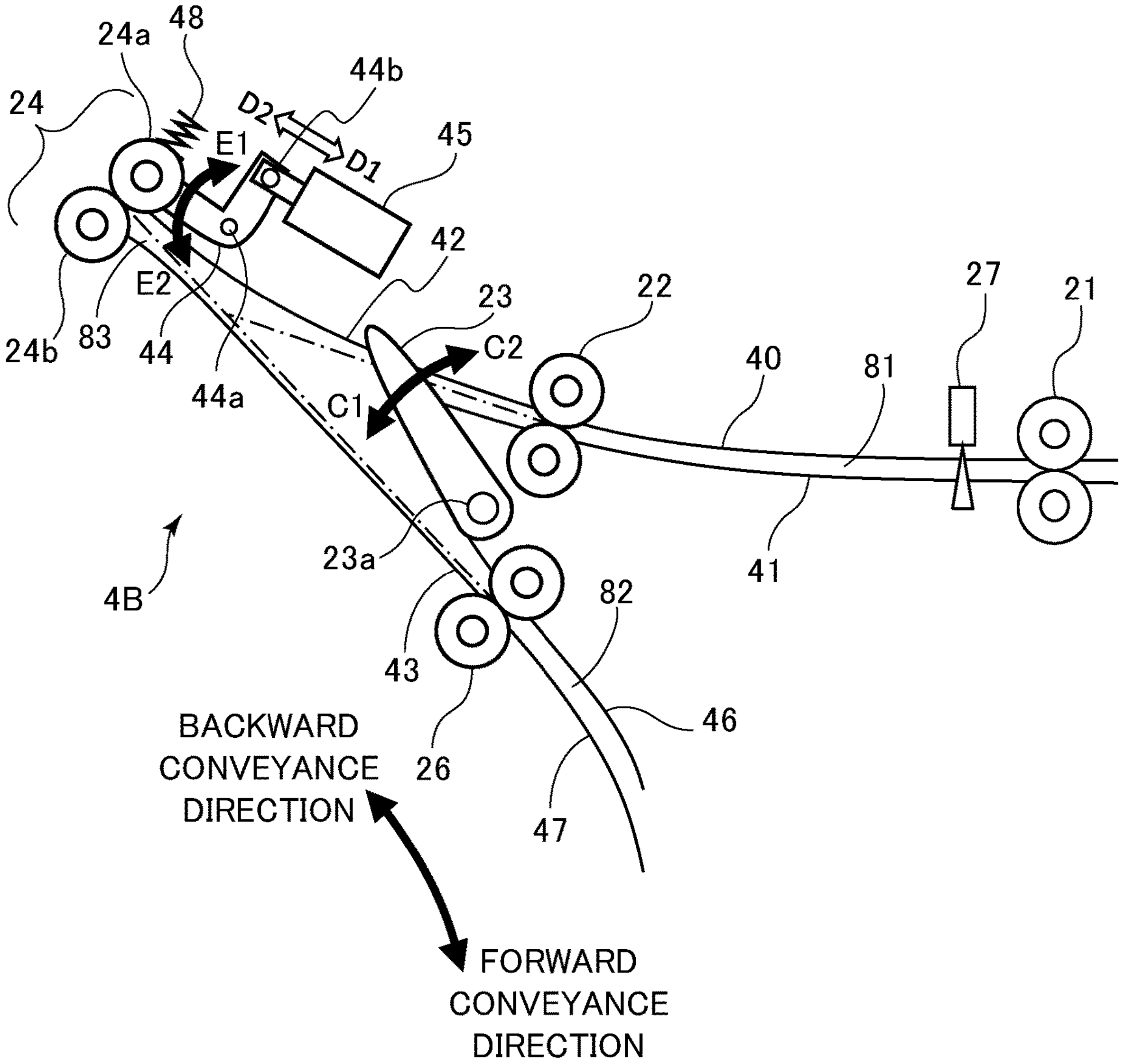
FIG. 2 is a schematic view of a buffering portion according to the first exemplary embodiment.

Next, the buffering operation will be described in detail with reference to FIGS. 2 to 4D. FIG. 2 is a schematic view of the buffering portion 4B, and FIGS. 3A to 4D each illustrate a buffering operation.

As illustrated in FIG. 2, the buffering portion 4B of the present exemplary embodiment includes the reverse conveyance rollers 24 serving as a reverse conveyance roller pair, the non-return flap 23, and in-body discharge rollers 26 serving as an intermediate roller pair. In addition, the inlet rollers 21, the pre-buffer rollers 22, and the entrance sensor 27 disposed in the entry path 81 also contribute to the buffering operation.

Conveyance guides making up the sheet conveyance path between the inlet rollers 21 and the pre-buffer rollers 22, that is, a part of the entry path 81, will be referred to as an "entrance upper guide 40" and an "entrance lower guide 41". In addition, conveyance guides making up the sheet conveyance path between the in-body discharge rollers 26 and the intermediate conveyance rollers 28, that is, a part of the in-body discharge path 82, will be referred to as an "in-body discharge upper guide 46" and an "in-body discharge lower guide 47". Further, a conveyance guide that guides the sheet from the same side as the entrance upper guide 40 at a position between the pre-buffer rollers 22 and the reverse conveyance rollers 24 will be referred to as a "reverse conveyance upper guide 42". In addition, a conveyance guide that guides the sheet from the same side as the in-body discharge lower guide 47 at a position between the reverse conveyance rollers 24 and the in-body discharge rollers 26 will be referred to as a "reverse conveyance lower guide 43".

The sheet conveyed by the inlet rollers 21 is guided to the pre-buffer rollers 22 by the entrance upper guide 40 and the entrance lower guide 41. The entrance sensor 27 is disposed on the entrance upper guide 40. As the entrance sensor 27, a reflection-type photosensor that radiates infrared light toward the entry path 81 and detects reflection light from the sheet to determine presence/absence of the sheet at a detection position can be used. In this case, a hole having a size equal to or bigger than the diameter of spotting light of the entrance sensor 27 is provided in the entrance lower guide 41 at a position opposing the entrance sensor 27 such that the infrared light is not reflected when the sheet is not passing through.

The non-return flap 23 is disposed at the portion downstream of the pre-buffer rollers 22 where the entry path 81 and the in-body discharge path 82 branch from the first discharge path 83. The non-return flap 23 is rotatably supported with respect to the in-body discharge upper guide 46 via a rotation shaft 23*a*. In addition, the non-return flap 23 is urged all the time by an unillustrated spring in a C2 direction, that is, a clockwise direction in FIG. 2, toward a position of FIG. 2 where the distal end portion of the non-return flap 23 overlaps with the reverse conveyance upper guide 42 as viewed in the axial direction of the rotation shaft 23*a*, that is, the width direction of the sheet. In addition, the spring constant of the spring mentioned above is set to such a value that when the sheet delivered out from the pre-buffer rollers 22 abuts the non-return flap 23, the non-return flap 23 pivots in a C1 direction, that is, a counterclockwise direction in FIG. 2, against the urging force of the spring. Therefore, the non-return flap 23 allows passage of the sheet conveyed from the pre-buffer rollers 22 toward the reverse conveyance rollers 24. Meanwhile, when the trailing end of the sheet in the entry path 81 passes the non-return flap 23, the non-return flap 23 pivots in the C2 direction to suppress backward movement of the sheet from the reverse conveyance rollers 24 to the pre-buffer rollers 22.

The reverse conveyance rollers 24 includes a reverse conveyance upper roller 24*a* and a reverse conveyance lower roller 24*b*. In the present exemplary embodiment, driving force is input to both of the reverse conveyance upper roller 24*a* and the reverse conveyance lower roller 24*b*, and rotation of the reverse conveyance upper roller 24*a* and rotation of the reverse conveyance lower roller 24*b* are synchronized all the time.

The reverse conveyance rollers 24 are configured to abut and separate from each other by a plunger solenoid 45. Specifically, one end of a separation lever 44 is coupled to a roller shaft of the reverse conveyance upper roller 24*a*, and the separation lever 44 is supported so as to be rotatable about a lever support shaft 44*a* with respect to the reverse conveyance upper guide 42. A solenoid coupling shaft 44*b* provided on the other end of the separation lever 44 is coupled to a plunger of the plunger solenoid 45.

When power is supplied to the plunger solenoid 45, the plunger is attracted in a D1 direction by magnetic force, the separation lever 44 rotates in an E1 direction, and the reverse conveyance rollers 24 transition to a separate state in which a nip portion of the roller pair is open. When the supply of power to the plunger solenoid 45 is stopped, the reverse conveyance upper roller 24*a* abuts the reverse conveyance lower roller 24*b* by an urging force of a pressurizing spring 48 coupled to the roller shaft of the reverse conveyance upper roller 24*a*, and the reverse conveyance rollers 24 transition to an abutting state in which the nip portion is closed. At this time, the separation lever 44 rotates in an E2 direction in accordance with the movement of the reverse conveyance upper roller 24*a*, and the plunger of the plunger solenoid 45 moves in a D2 direction.

The in-body discharge rollers 26 are a roller pair next to the reverse conveyance rollers 24 in a sheet conveyance direction in the in-body discharge path 82, and are capable of rotating in a normal rotation direction and in a reverse rotation direction. That is, the in-body discharge rollers 26 are capable of conveying the sheet in both of the sheet conveyance direction from the reverse conveyance rollers 24 toward the binding processing portion 4A, that is, a forward conveyance direction in the in-body discharge path 82, and a backward conveyance direction from the binding processing portion 4A toward the reverse conveyance rollers 24.

Next, the buffering operation of the buffering portion 4B will be described in detail with reference to FIGS. 3A to 4D. The buffering operation is an operation in which a predetermined number of sheets constituting a sheet bundle of the next copy is held in the buffering portion 4B until the binding process on the sheet bundle of the previous copy is completed in the binding processing portion 4A. By performing the buffering operation, the image forming system can execute an image formation job including a binding process without degrading the productivity, that is, the number of images output per unit time, of the image forming apparatus 1.

Hereinafter, to distinguish sheets, the sheets will be referred to as, in the order of being passed onto the post-processing apparatus 4 from the image forming apparatus 1, a "sheet S1", a "sheet S2", and a "sheet S3". In addition, among ends of the sheet in the sheet conveyance direction, the end that passes through the inlet rollers 21 first will be referred to as a "first end", and the end that passes through the inlet rollers 21 after the first end will be referred to as a "second end". In addition, the conveyance speed of the sheet in the horizontal conveyance portion 14 of the image forming apparatus 1 will be referred to as V1, and the conveyance speed after being accelerated in the post-processing apparatus 4 will be referred to as V2.

Figure 3A:
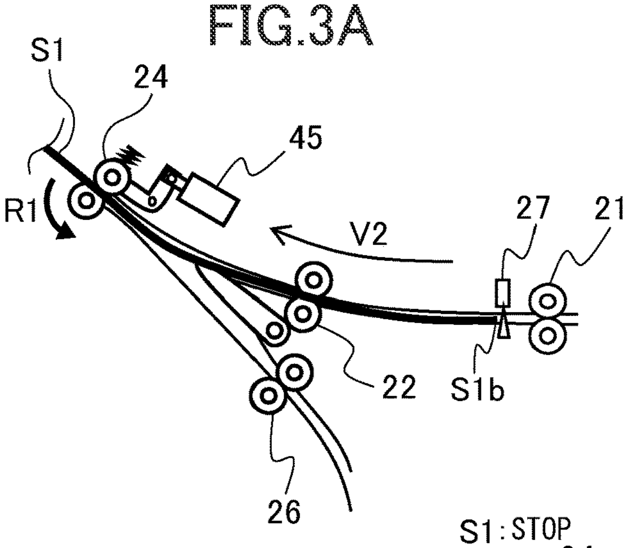
FIGS. 3A to 3D are diagrams for describing a buffering operation according to the first exemplary embodiment.

FIG. 3A illustrates a state at a time when the trailing end of the sheet S1 in the entry path 81, that is, a second end S1*b* has just passed the detection position of the entrance sensor 27. When the entrance sensor 27 detects the passage of the second end S1*b* of the sheet S1, the pre-buffer rollers 22 and the reverse conveyance rollers 24 accelerate the sheet S1 from the speed V1 to the speed V2. As a result of accelerating the sheet S1 in this manner, the distance between the sheet S1 and the sheet S2 following the sheet S2 is increased, and thus a sheet interval required for the reversing operation, that is, the switch-back by the reverse conveyance rollers 24 is secured. At the time of FIG. 3A, the reverse conveyance rollers 24 rotate in a pre-reversal rotation direction R1, and convey the sheet S1 in a direction toward the upper discharge tray 25.

Figure 3B:
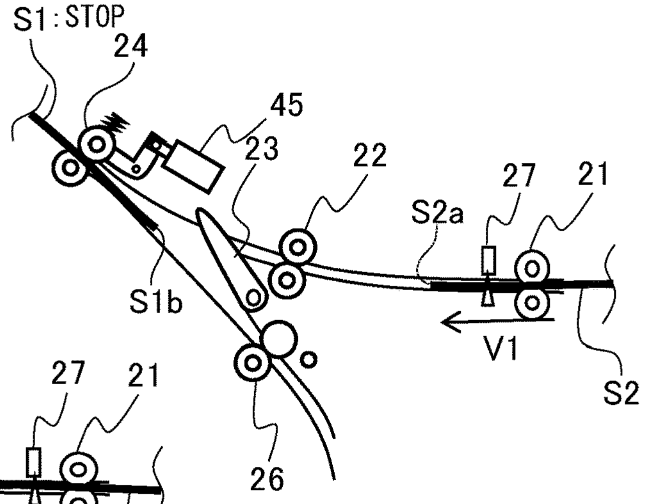

FIG. 3B illustrates a state at a time when the trailing end of the sheet S1 in the entry path 81, that is, the second end S1*b* has just passed the non-return flap 23. The reverse conveyance rollers 24 temporarily stop the rotation at a predetermined timing after the trailing end of the sheet S1, that is, the second end S1*b* has passed the non-return flap 23. The predetermined timing is determined on the basis of elapsed time from the timing at which the entrance sensor 27 has detected the passage of the trailing end of the sheet S1, that is, the second end S1*b*.

Figure 3C:
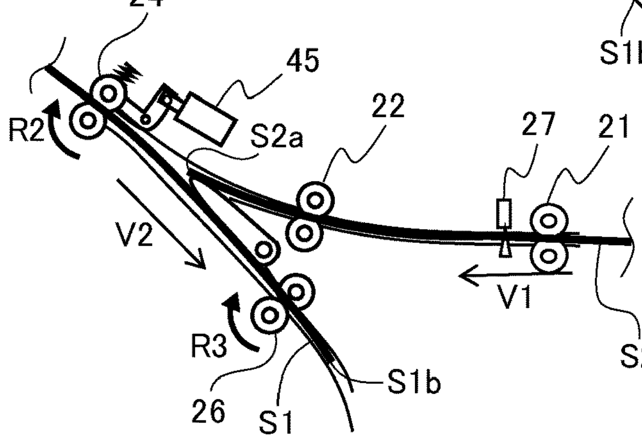

FIG. 3C illustrates a state after the reverse conveyance rollers 24 have started rotating in a rotation direction R2, which is a rotation direction after the start of reverse rotation, and the sheet S1 has been passed onto the in-body discharge rollers 26. The in-body discharge rollers 26 receive the sheet S1 in a state of being rotating in a rotation direction R3, and conveys the sheet S1 in a forward conveyance direction in the in-body discharge path 82. In addition, after the leading end of the sheet S1 in the in-body discharge path 82, that is, the second end S1*b* has passed the position of the non-return flap 23, the leading end of the sheet S2 in the entry path 81, that is, a first end S2*a* reaches the non-return flap 23. Therefore, the sheets S1 and S2 are conveyed so as to pass each other in the branching portion of the conveyance path.

Figure 3D:
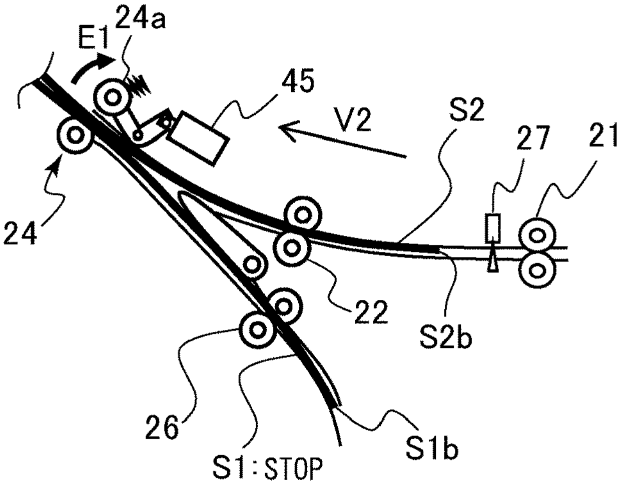

FIG. 3D illustrates a state at a time when the leading end of the sheet S1 in the in-body discharge path 82, that is, the second end S1*b* has been conveyed by a predetermined amount from the in-body discharge rollers 26 and the in-body discharge rollers 26 have temporarily stopped. After the time of FIG. 3C, power is supplied to the plunger solenoid 45 before the leading end of the sheet S2 in the entry path 81, that is, the first end S2*a* reaches the reverse conveyance rollers 24. As a result of this, the reverse conveyance upper roller 24*a* moves in the E1 direction, and the reverse conveyance rollers 24 are separated from each other. The sheet S1 is held by the in-body discharge rollers 26 in a stationary state, and part of the sheet S1 is positioned between the reverse conveyance rollers 24 in a separate state. Therefore, the sheet S2 delivered into the first discharge path 83 from the entry path 81 by the pre-buffer rollers 22 is conveyed so as to slide on the sheet S1. To be noted, the sheet S2 is also accelerated from the speed V1 to the speed V2 by the pre-buffer rollers 22 after the entrance sensor 27 has detected the passage of the trailing end of the sheet S2, that is, the second end S2*b*.

Figure 4A:
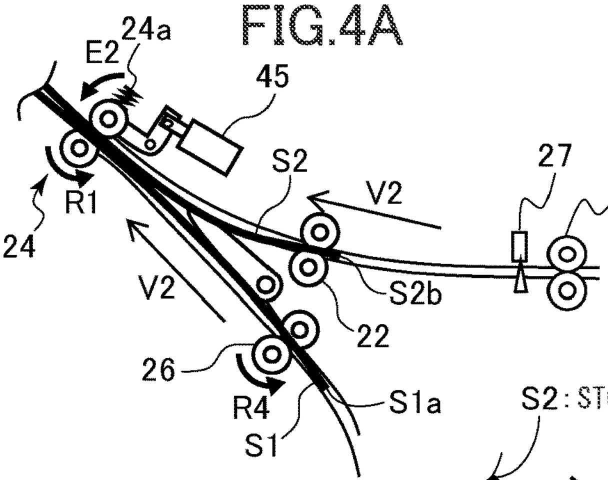
FIGS. 4A to 4D are diagrams for describing the buffering operation according to the first exemplary embodiment.

FIG. 4A illustrates a state after the in-body discharge rollers 26 have started conveying the sheet S1 in the backward conveyance direction. The in-body discharge rollers 26 start rotating in a rotation direction R4 at a timing when the sheet S2 is conveyed to a predetermined position, and convey the sheet S1 in the backward conveyance direction toward the reverse conveyance rollers 24. The target speed of the in-body discharge rollers 26 is also set to the speed V2 similarly to the pre-buffer rollers 22. At a timing after the speed of the sheet S1 has become approximately equal to the speed of the sheet S2, that is, after the relative speed therebetween has become approximately zero, the supply of power to the plunger solenoid 45 is stopped. As a result of this, the reverse conveyance upper roller 24*a* moves in the E2 direction, thus the reverse conveyance rollers 24 abut each other again, and the sheets S1 and S2 are nipped between the reverse conveyance rollers 24 in a state of being superimposed on each other. In addition, the reverse conveyance rollers 24 have started rotating in the rotation direction R1 in synchronization with the in-body discharge rollers 26, and are controlled such that the peripheral speed thereof becomes equal to that of the pre-buffer rollers 22 and the in-body discharge rollers 26, which is the speed V2, before the separate state is switched to the abutting state.

Figure 4B:
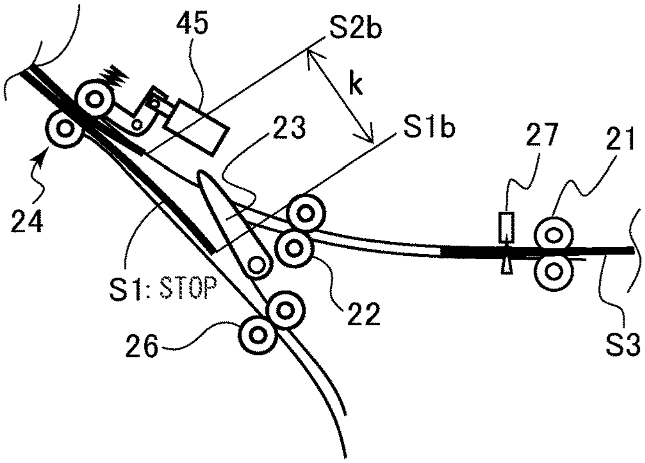

FIG. 4B illustrates a state after the trailing end of the sheet S2 in the entry path 81, that is, the second end S2*b* has passed the non-return flap 23. The reverse conveyance rollers 24 temporarily stops the rotation at a predetermined timing after the trailing end of the sheet S2, that is, the second end S2*b* has passed the non-return flap 23. At this time, the sheet S1 and S2 in a superimposed state both stop moving, and the second end S1*b* of the sheet S1 projects in the forward conveyance direction of the in-body discharge path 82 by a predetermined offset amount k with respect to the second end S2*b* of the sheet S2. This offset amount k is controlled by the in-body discharge rollers 26 starting the conveyance of the sheet S1 in the backward conveyance direction at a predetermined timing as described with reference to FIG. 4A.

Figure 4C:
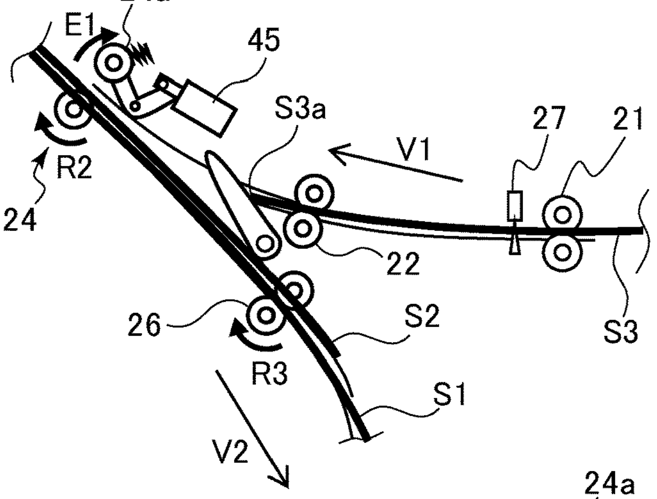

FIG. 4C illustrates a state after the reverse conveyance rollers 24 have started rotating in the rotation direction R2, and the sheets S1 and S2 in the superimposed state have been passed onto the in-body discharge rollers 26. The in-body discharge rollers 26 receive the sheets S1 and S2 in a state of being rotating in the rotation direction R3, and convey the sheets S1 and S2 in the forward conveyance direction in the in-body discharge path 82. The sheets S1 and S2 are conveyed to the binding processing portion 4A through the in-body discharge path 82 while maintaining the superimposed state.

To be noted, the leading end of the third sheet S3 in the entry path 81, that is, the first end S3*a* reaches the non-return flap 23 after the leading end of the sheet S2 in the in-body discharge path 82, that is, the second end S2*b* has passed the position of the non-return flap 23. Therefore, the sheets S2 and S3 are conveyed so as to pass each other at the branching portion of the conveyance path. In addition, the reverse conveyance upper roller 24*a* moves in the E1 direction after the sheet S2 is nipped between the in-body discharge rollers 26, and the reverse conveyance rollers 24 transition to the separate state again as preparation for receiving the sheet S3 following the sheet S2.

Figure 4D:
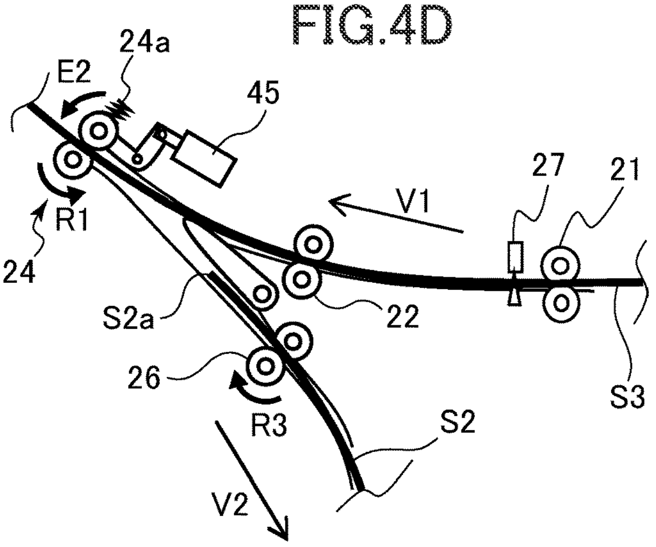

FIG. 4D illustrates a state after the reverse conveyance rollers 24 have transitioned from the separate state to the abutting state. After the first end S2*a* of the sheet S2 is released from the reverse conveyance rollers 24, the reverse conveyance rollers 24 are switched from the separate state to the abutting state and nip the sheet S3. Then, the reverse conveyance rollers 24 perform the reverse conveyance operation on the sheet S3, and the sheet S3 is conveyed to the binding processing portion 4A through the in-body discharge path 82 subsequently to the sheets S1 and S2.

Case of Buffering Three or More Sheets

Although an operation of buffering the two sheets S1 and S2 has been described above with reference to FIGS. 3A to 4D, the buffering portion 4B of the present exemplary embodiment is also capable of buffering three or more sheets. In this case, the in-body discharge rollers 26 stop in a state of nipping the sheets S1 and S2 as illustrated in FIG. 4C, and convey the sheets S1 and S2 in the backward conveyance direction at a predetermined timing after the entrance sensor 27 has detected the second end of the third sheet S3. Then, the reverse conveyance rollers 24 take the abutting state after the conveyance speed of the in-body discharge rollers 26 is synchronized with the conveyance speed of the pre-buffer rollers 22, and thus the reverse conveyance rollers 24 nip the three sheets S1, S2, and S3 in a superimposed state. At this time, the in-body discharge rollers 26 start the backward conveyance of the sheets S1 and S2 at a predetermined timing, and thus the second end of the second sheet S2 projects in the forward conveyance direction by the predetermined offset amount k with respect to the second end of the third sheet S3.

In addition, by repeating opening/closing the reverse conveyance rollers 24 and reverse rotation of the in-body discharge rollers 26 in an appropriate order, the buffering portion 4B can buffer, for example, five sheets at most. As a result of having a buffering function of superimposing three or more sheets, the post-processing apparatus 4 can process sheets without lowering the productivity of the image forming apparatus 1, which contributes to improvement of the overall productivity of the image forming system.

Drive Control of Roller

Figure 5:
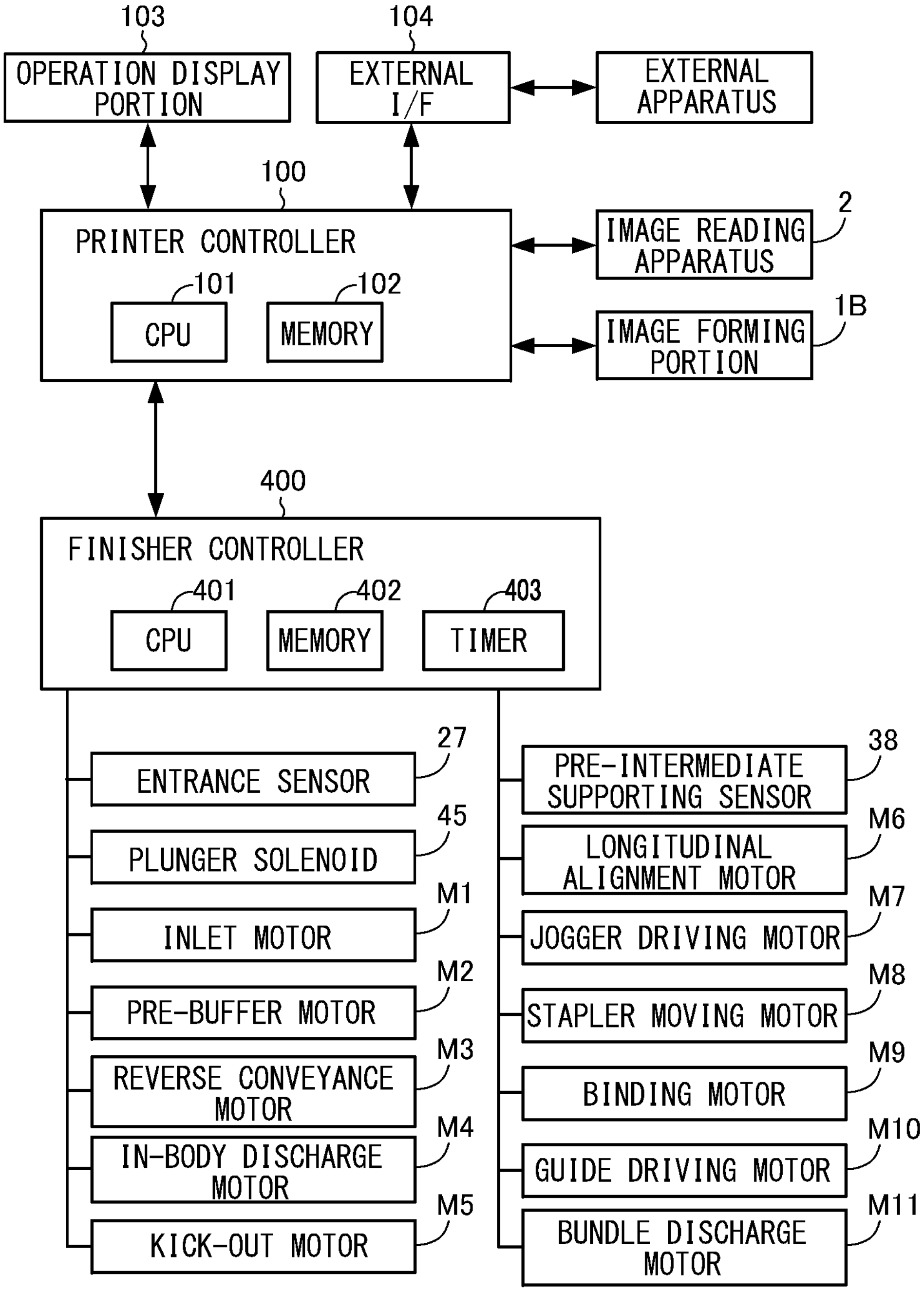
FIG. 5 is a block diagram of the image forming system according to the first exemplary embodiment.

Next, a control configuration that realizes the operation described with reference to FIGS. 3A to 4D will be described. FIG. 5 is a block diagram illustrating a configuration of the image forming system 1S according to the present exemplary embodiment. The image forming apparatus 1 includes the printer controller 100, and the post-processing apparatus 4 includes a finisher controller 400. The printer controller 100 and the finisher controller 400 are connected to each other via a communication interface, and control the operation of the image forming system 1S in cooperation with each other.

The printer controller 100 includes a central processing unit: CPU 101, and a memory 102. The CPU 101 reads and executes a program stored in the memory 102, and thus performs overall control of the image forming apparatus 1. For example, the CPU 101 performs processing of causing the image forming portion 1B to perform an image forming operation, processing of causing the image reading apparatus 2 to perform a reading operation to obtain image information, and the like. The memory 102 includes a nonvolatile storage medium such as a read-only memory: ROM, and a volatile storage medium such as a random access memory: RAM, and serves as a storage space for programs and data and a work space for the CPU 101 to execute the programs in. The memory 102 serves as an example of a non-transitory storage medium storing a program for controlling an image forming apparatus.

The printer controller 100 is connected to an external apparatus such as a personal computer or a mobile information device via the external interface (I/F) 104, and receives a command to execute an image formation job or the like issued to the image forming system 1S. In addition, the printer controller 100 is connected to an operation display portion 103 serving as a user interface of the image forming system 1S. The operation display portion 103 includes a display apparatus such as a liquid crystal panel that shows information to the user, and an input device such as a physical key or a touch panel function of a liquid crystal panel through which an input operation from the user is received. The printer controller 100 communicates with the operation display portion 103 to control what is displayed on the display apparatus and receive information input through the input device.

The finisher controller 400 includes a central processing unit: CPU 401, a memory 402, and a timer 403. The CPU 401 reads and executes a program stored in the memory 402, and performs overall control of the post-processing apparatus 4. The memory 402 includes a nonvolatile storage medium such as a read-only memory: ROM, and a volatile storage medium such as a random access memory: RAM, and serves as a storage space for programs and data and a work space for the CPU 401 to execute the programs in. The memory 402 serves as an example of a non-transitory storage medium storing a program for controlling an image forming apparatus.

The timer 403 is a circuit element having a timekeeping function, and is provided as an integrated circuit serving as a real-time clock, or as a module of a program executed by the CPU 401. To be noted, this is not limited to the timer 403, and each function provided in the printer controller 100 and finisher controller 400 can be mounted on the circuit of the controller in the form of independent hardware such as an application specific integrated circuit: ASIC, or provided as software as a function unit of a program. In addition, part or all of functions of the finisher controller 400 that will be described below may be provided in the printer controller 100.

The post-processing apparatus 4 includes a plurality of motors M1 to M11 serving as drive sources for conveying sheets or drive sources of the binding processing portion 4A, in addition to the entrance sensor 27, the pre-intermediate supporting sensor 38, the plunger solenoid 45, and the stapler 51 described above. Among these, an inlet motor M1 rotationally drives the inlet rollers 21. A pre-buffer motor M2 rotationally drives the pre-buffer rollers 22. A reverse conveyance motor M3 rotationally drives the reverse conveyance rollers 24. An in-body discharge motor M4 rotationally drives the in-body discharge rollers 26. A kick-out motor M5 rotationally drives the kick-out rollers 29. The other motors M6 to M11 that are mainly related to a binding process performed by the binding processing portion 4A and discharge of the bound sheet bundle will be described later. To be noted, although each roller described above is driven by an independent motor, which is corresponding one of the motors M1 to M5, a plurality of rollers can be controlled by one motor as long as the driving state of each roller can be appropriately controlled as will be described below.

The operation sequence of each roller will be described below with reference to flowcharts of FIGS. 6 to 9. Each step of the flowcharts is processed by executing the program read by the CPU 401 of the finisher controller 400 from the memory 402. In addition, each operation sequence is started in the case where the finisher controller 400 has received a notification indicating that execution of an image formation job in which the lower discharge tray 37 is set as the sheet discharge destination has been started from the printer controller 100.

To be noted, in the description below, the start and stop of rotation of roller and change of rotation speed of the roller refer to processing of the CPU 401 to transmit a signal instructing a rotation speed or a rotation direction to a driving circuit of each of the motors M1 to M5. In addition, an "activation timer", a "stop timer", and the like refer to functions of the timer 403 to count down, on the basis of a preset waiting time, to the execution timing of a target process with respect to the occurrence time of a predetermined event.

Operation Sequence of Inlet Rollers

Figure 6:
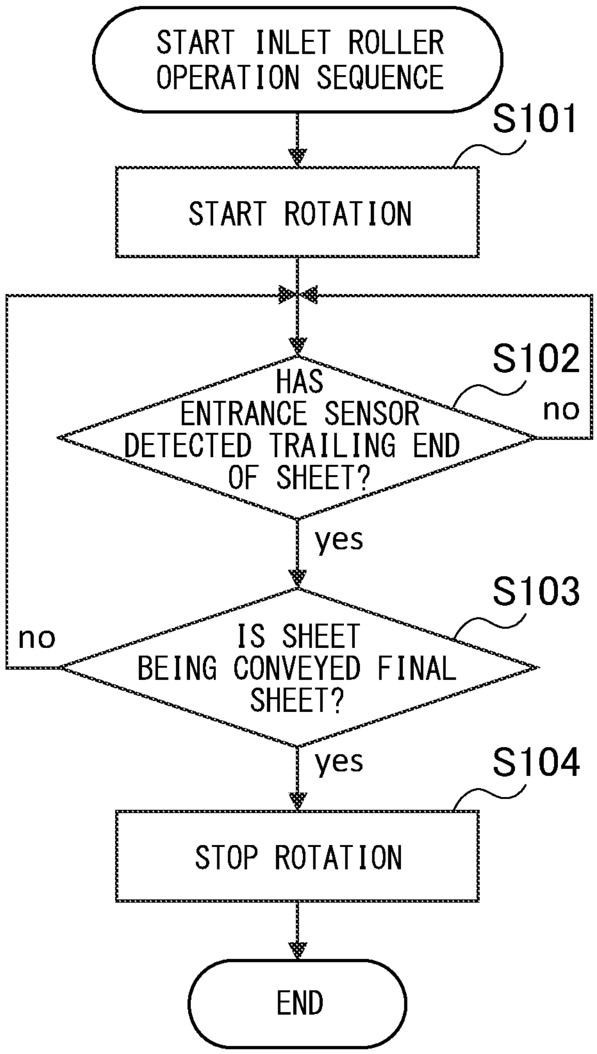
FIG. 6 is a flowchart illustrating an operation sequence of inlet rollers according to the first exemplary embodiment.

First, the operation sequence of the inlet rollers 21 will be described with reference to FIG. 6.

In step S101, rotation of the inlet rollers 21 is started at the target speed V1. In step S102, a standby state is maintained while determining whether or not passage of the trailing end of the sheet in the entry path 81 has been detected by the entrance sensor 27. When the entrance sensor 27 detects the passage of the trailing end of the sheet, whether or not the sheet being conveyed is a final sheet is determined in step S103, and in the case where the sheet is not the final sheet, the process returns to step S102 and is continued. In the case where the sheet being conveyed is the final sheet in step S103, the rotation of the inlet rollers 21 is stopped in step S104, and the operation sequence is finished.

Operation Sequence of Pre-buffer Rollers

Figure 7:
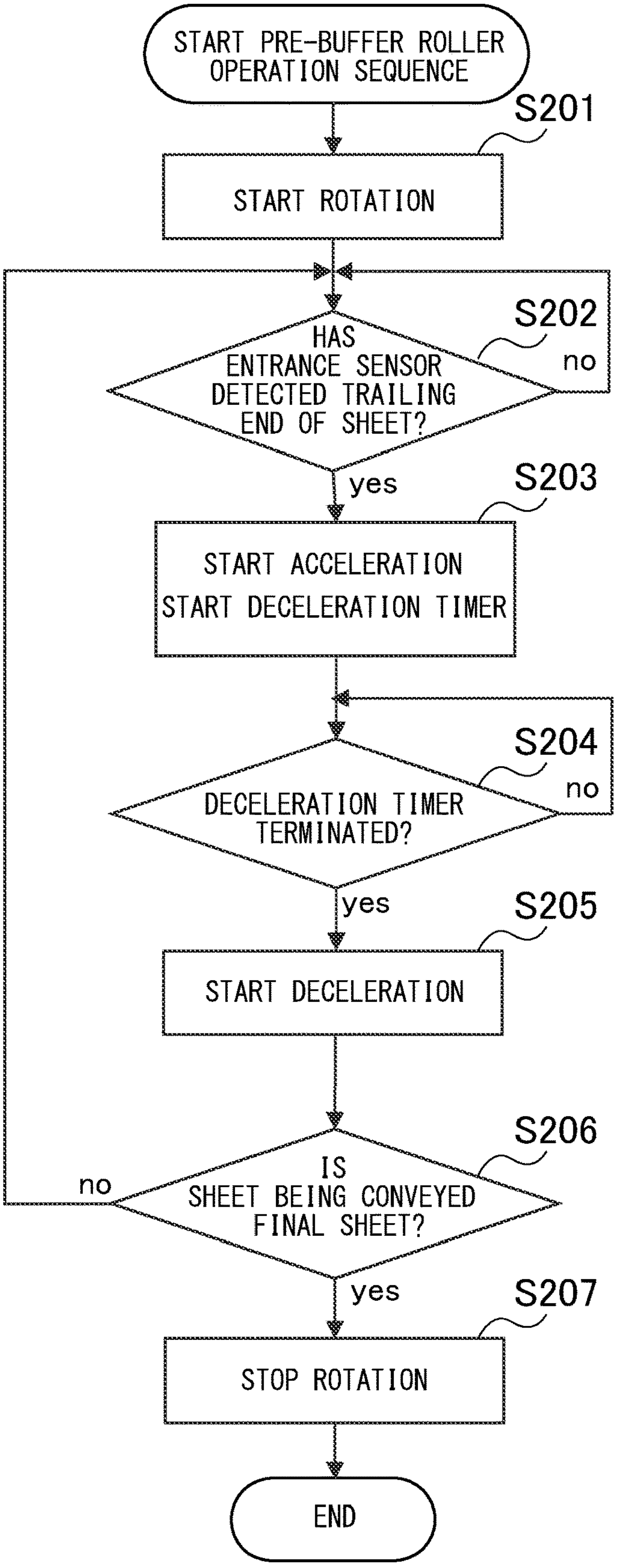
FIG. 7 is a flowchart illustrating an operation sequence of pre-buffer rollers according to the first exemplary embodiment.

Next, an operation sequence of the pre-buffer rollers 22 will be described with reference to FIG. 7.

In step S201, rotation of the pre-buffer rollers 22 is started at the target speed V1. In step S202, a standby state is maintained while determining whether or not passage of the trailing end of the sheet in the entry path 81 has been detected by the entrance sensor 27. When the entrance sensor 27 detects the passage of the trailing end of the sheet, in step S203, processing of accelerating the pre-buffer rollers 22 to the target speed V2 is started and a deceleration timer is set.

The termination time of the deceleration timer is set to a timing at which the trailing end of the sheet passes through the pre-buffer rollers 22 or a timing thereafter.

In step S204, a standby state is maintained while counting down the deceleration timer. When the countdown is finished, processing of decelerating the pre-buffer rollers 22 to the target speed V1 is started in step S205. In step S206, whether or not the sheet being conveyed is a final sheet is determined, and in the case where the sheet is not the final sheet, the process returns to step S202 and is continued. In the case where the sheet being conveyed is the final sheet in step S206, the rotation of the pre-buffer rollers 22 is stopped in step S207, and the operation sequence is finished.

Operation Sequence of Reverse Conveyance Rollers

Next, an operation sequence of the reverse conveyance rollers 24 will be described with reference to FIG. 8.

In step S301, whether or not the sheet being conveyed is a target of the buffering operation is determined. In the case where the sheet is a target of the buffering operation, the process proceeds to step S302, and in the case where the sheet is not a target of the buffering operation, the process proceeds to step S321. The sheet serving as a target of the buffering operation is, in the case of executing an image formation job of forming a plurality of copies of sheet bundles by the binding processing portion 4A, a sheet of a next copy that is passed onto the post-processing apparatus 4 from the image forming apparatus 1 before the binding process on a sheet bundle of the previous copy is completed. The number of sheets serving as targets of the buffering operation is preset in accordance with the contents of the image formation job notified from the printer controller 100, for example, particularly, the interval of discharge of sheets from the image forming apparatus 1, the sheet length in the conveyance direction, the process speed, and the like.

Steps S302 to S320 correspond to an operation performed on a sheet serving as a buffering target. In step S302, whether or not the sheet being conveyed is the first sheet is determined. In the case where the sheet is the first sheet, the process proceeds to step S303, and in the case where the sheet is not the first sheet, the process proceeds to step S307.

In step S303, rotation of the reverse conveyance rollers 24 is started at the target speed V1 in the pre-reversal rotation direction R1, and the reverse conveyance rollers 24 are set to the abutting state in which the nip portion is formed. In step S304, a standby state is maintained while determining whether or not the entrance sensor 27 has detected passage of the trailing end of the sheet in the entry path 81. When the entrance sensor 27 detects the passage of the trailing end of the sheet, processing of accelerating the reverse conveyance rollers 24 to the target speed V2 is started in step S305, and each timer is set in step S306.

The termination time of a reverse conveyance timer is set to a timing after the second end of the sheet passes the non-return flap 23 and before the second end of the sheet passes through the reverse conveyance rollers.

The termination time of a separation timer is set to a timing after the leading end of the sheet reversed by the reverse conveyance rollers 24, that is, the second end of the sheet reaches the in-body discharge rollers 26.

Figure 9:
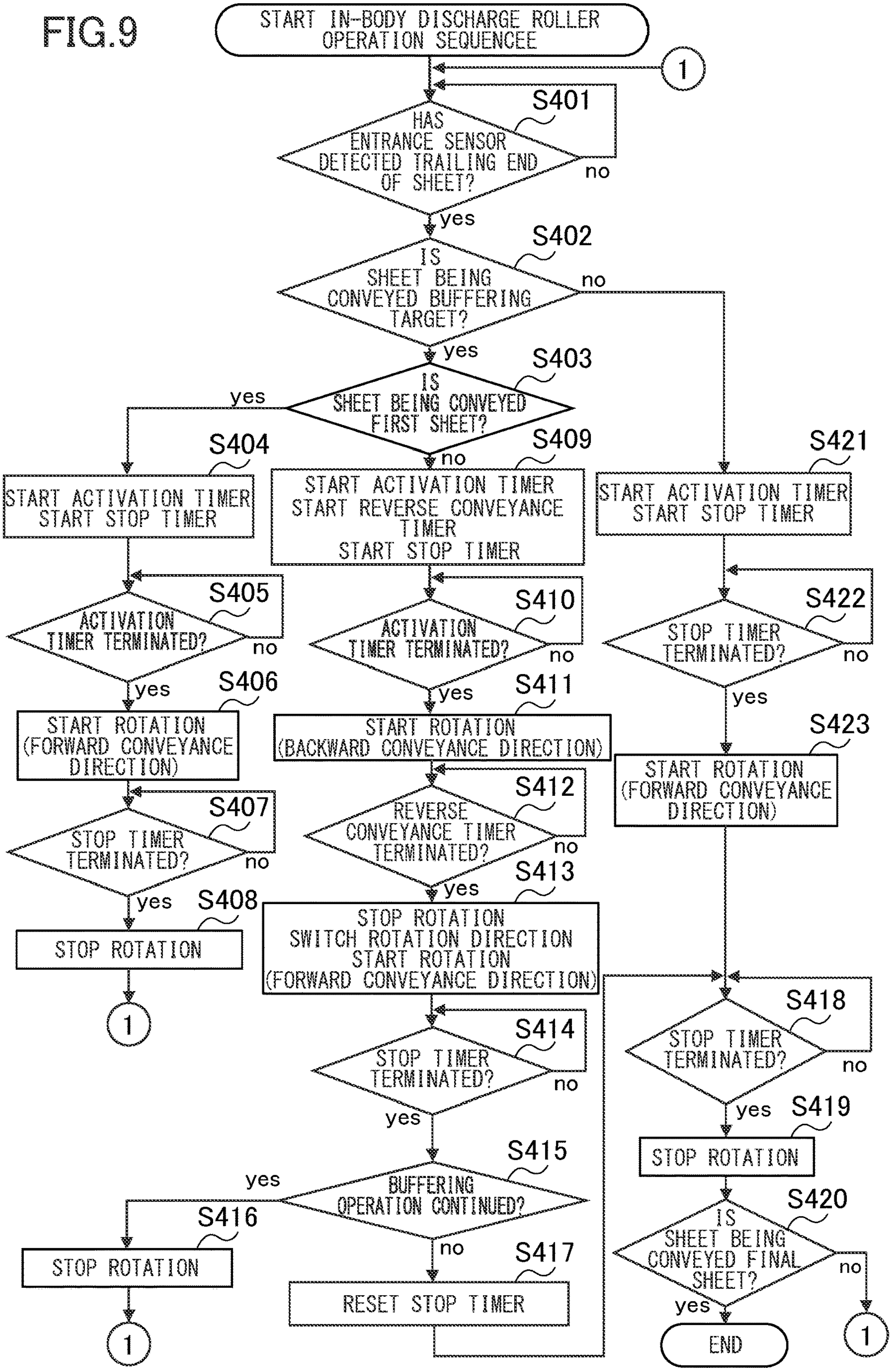
FIG. 9 is a flowchart illustrating an operation sequence of in-body discharge rollers according to the first exemplary embodiment.

The termination time of a stop timer is set so as to be synchronized with stop of the in-body discharge rollers 26 in step S408 of FIG. 9.

After step S306, the process proceeds to step S313 similarly to the case where the sheet being conveyed is not the first sheet.

In step S307, a standby state is maintained while determining whether or not the entrance sensor 27 has detected passage of the trailing end of the sheet in the entry path 81. When the entrance sensor 27 detects the passage of the trailing end of the sheet, each timer is set in step S308.

The termination time of the activation timer is set so as to be synchronized with the start of backward conveyance of the sheet in step S411 of FIG. 9 by the in-body discharge rollers 26.

The termination time of a nip timer is set to a timing after the peripheral speed of the reverse conveyance rollers 24 whose rotation is started in step S310 below reaches the speed V2.

The termination time of a reverse conveyance timer is set to a timing after the trailing end of the sheet in the entry path 81 passes the non-return flap 23 and before the trailing end of the sheet passes the reverse conveyance rollers 24.

The termination time of the separation timer is set to a timing after the leading end of the sheet reversed by the reverse conveyance rollers 24, that is, the second end of the sheet reaches the in-body discharge rollers 26.

The termination time of the stop timer is set so as to synchronize with stop of the in-body discharge rollers 26 in step S419 of FIG. 9.

In step S309, a standby state is maintained while counting down the activation timer. Here, while the reverse conveyance rollers 24 are standing by in the separate state, the sheet being conveyed reaches the reverse conveyance rollers 24, and is superimposed on a sheet nipped between the in-body discharge rollers 26 as illustrated in FIG. 3D. When the countdown is finished, rotation of the reverse conveyance rollers 24 is started at the target speed V1 and in the pre-reversal rotation direction R1 in step S310. In step S311, a standby state is maintained while counting down the nip timer. When the countdown is finished, supply of power to the plunger solenoid 45 is stopped in step S312, and the reverse conveyance rollers 24 are caused to abut each other as illustrated in FIG. 4A. At this time, the reverse conveyance rollers 24 are switched from the separate state to the abutting state while the reverse conveyance rollers 24 are rotating at a peripheral speed equal to that of the in-body discharge rollers 26. After step S312, the process proceeds to step S313 similarly to the case where the sheet being conveyed is the first sheet.

In step S313, a standby state is maintained while counting down the reverse conveyance timer. When the countdown is finished, in step S314, the reverse conveyance rollers 24 are temporarily stopped as illustrated in FIG. 4B, the rotation direction is switched from the pre-reversal rotation direction R1 to the post-reversal rotation direction R2, and the reverse conveyance rollers 24 are reactivated at the target speed V2. In step S315, whether or not to continue the buffering operation, that is, whether or not the sheet to be conveyed next is also a target of the buffering operation is determined, and in the case where the buffering operation is to be continued, the process proceeds to step S316. In step S316, a standby state is maintained while counting down the separation timer. When the countdown is finished, in step S317, supply of power to the plunger solenoid 45 is stopped, and the reverse conveyance rollers 24 are separated from each other as illustrated in FIG. 4C. In step S318, a standby state is maintained while counting down the stop timer. When the countdown is finished, in step S319, the reverse conveyance rollers 24 are stopped. In step S320, whether or not the sheet being conveyed is the final sheet is determined, and in the case where the sheet is not the final sheet, the process returns to step S301 and is continued. In the case where it has been determined in step S320 that the sheet being conveyed is the final sheet, the operation sequence is finished. In contrast, in the case where it has been determined to not continue the buffering operation in step S315, a standby state is taken in step S331 until the stop timer is terminated, and then the stop timer is reset in step S332. The termination time of the reset timer is set to a timing after the trailing end of the sheet in the in-body discharge path 82 has passed through the reverse conveyance rollers 24. After step S332, the process proceeds to step S318, and the processing described above is performed.

Steps S321 to S329 correspond to an operation on a sheet that is not a buffering target. In this case, the reverse conveyance of the sheet by the reverse conveyance rollers 24 is performed while the reverse conveyance rollers 24 are still in the abutting state. That is, in step S321, rotation of the reverse conveyance rollers 24 is started at the target speed V1 in the pre-reversal rotation direction R1, and the reverse conveyance rollers 24 is set to the abutting state in which the nip portion is formed. In step S322, a standby state is maintained while determining whether or not the entrance sensor 27 has detected passage of the trailing end of the sheet in the entry path 81. When the entrance sensor 27 detects the passage of the trailing end of the sheet, processing of accelerating the reverse conveyance rollers 24 to the target speed V2 is started in step S323, and each timer is set in step S324.

The termination time of the reverse conveyance timer is set to a timing after the second end of the sheet passes the non-return flap 23 and before the second end of the sheet passes through the reverse conveyance rollers.

The termination time of the stop timer is set to a timing after the trailing end of the sheet in the in-body discharge path 82 passes through the reverse conveyance rollers 24.

In step S325, a standby state is maintained while counting down the reverse conveyance timer. When the countdown is finished, in step S326, the reverse conveyance rollers 24 are temporarily stopped, the rotation direction of the reverse conveyance rollers 24 is switched from the pre-reversal rotation direction R1 to the post-reversal rotation direction R2, and the reverse conveyance rollers 24 are reactivated at the target speed V2. In step S327, a standby state is maintained while counting down the stop timer. When the countdown is finished, in step S328, the reverse conveyance rollers 24 are stopped. In step S329, whether or not the sheet being conveyed is the final sheet is determined, and in the case where the sheet is not the final sheet, the process returns to step S301 and is continued. In the case where it has been determined in step S329 that the sheet being conveyed is the final sheet, the operation sequence is finished.

Operation Sequence of In-body Discharge Rollers

Next, the operation sequence of the in-body discharge rollers 26 will be described with reference to FIG. 9.

In step S401, a standby state is maintained while determining whether or not passage of the trailing end of the sheet in the entry path 81 has been detected by the entrance sensor 27. When the entrance sensor 27 detects the passage of the trailing end of the sheet, whether or not the sheet being conveyed is a target of the buffering operation is determined in step S402. In the case where the sheet is a target of the buffering operation, the process proceeds to step S403, and in the case where the sheet is not a target of the buffering operation, the process proceeds to step S421. In step S403, whether or not the sheet being conveyed is the first sheet of a sheet bundle to be processed by the binding processing portion 4A is determined. In the case where the sheet is the first sheet of the sheet bundle, the process proceeds to step S404, and in the case where the sheet is not the first sheet of the sheet bundle, the process proceeds to step S409.

In step S404, each timer is set on the basis of the timing at which the entrance sensor 27 has detected the passage of the trailing end of the sheet in step S401.

The termination time of the activation timer is set to such a timing that the in-body discharge rollers 26 can be accelerated to the target speed V2 before the sheet reversed by the reverse conveyance rollers 24 reaches the in-body discharge rollers 26.

The termination time of the stop timer is set to a timing when the leading end of the sheet in the in-body discharge path 82 is conveyed to a predetermined distance past the reverse conveyance rollers 24.

In step S405, a standby state is maintained while counting down the activation timer. When the countdown is finished, in step S406, rotation of the in-body discharge rollers 26 is started at the target speed V2 in the rotation direction R3 following the forward conveyance direction in the in-body discharge path 82. In step S407, a standby state is maintained while counting down the stop timer. When the countdown is finished, the in-body discharge rollers 26 are stopped in step S408, and the process returns to step S401. The timing at which the in-body discharge rollers 26 are stopped in step S408 is synchronized with the timing of stopping the reverse conveyance rollers 24 in step S319 of FIG. 8. In addition, by stopping the in-body discharge rollers 26 in step S408, the first sheet serving as a buffering target is stopped in a state of being held by the in-body discharge rollers 26 as illustrated in FIG. 3D.

Steps S409 to S418 correspond to an operation performed when conveying a sheet serving as a buffering target excluding the first sheet. To be noted, during execution of steps S409 to S413, the in-body discharge rollers 26 come into contact not with the sheet being conveyed but with the sheet held by the in-body discharge rollers 26, that is, the sheet being buffered. For example, when the in-body discharge rollers 26 operate in the case where the second sheet S2 serves as the "sheet being conveyed", the in-body discharge rollers 26 actually move the first sheet S1 that is being buffered in the period between FIGS. 4B and 4C, until the second end S2*b* of the sheet S2 reaches the in-body discharge rollers 26.

In step S409, each timer is set on the basis of the timing at which the entrance sensor 27 has detected the passage of the trailing end of the sheet in step S401.

The termination time of the activation timer is set such that the offset amount between the sheet being buffered, whose conveyance is started in the backward conveyance direction in step S411 below, and the sheet being conveyed is the predetermined offset amount k.

Figure 8:
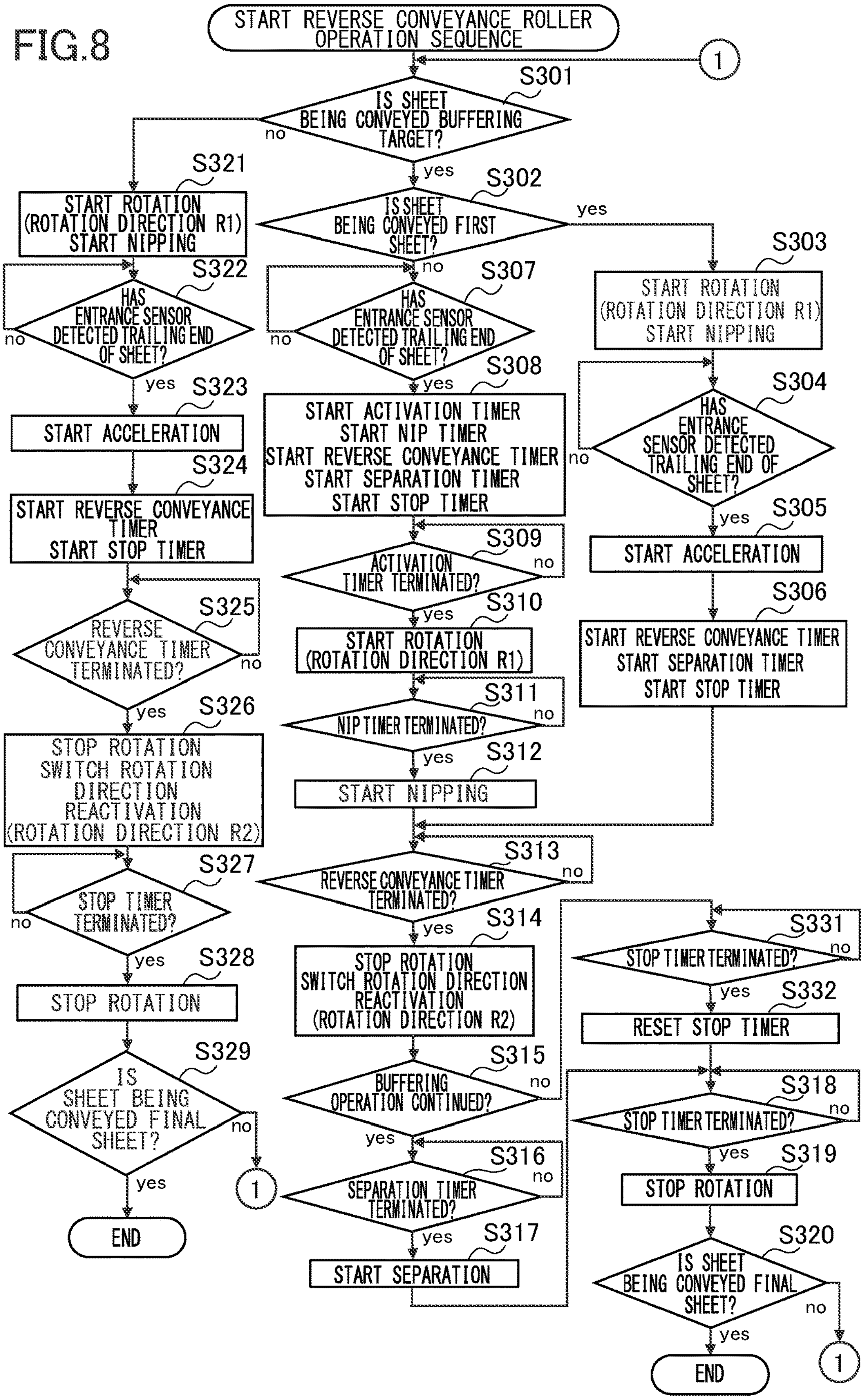
FIG. 8 is a flowchart illustrating an operation sequence of reverse conveyance rollers according to the first exemplary embodiment.

The termination time of the reverse conveyance timer is set so as to synchronize with the timing at which rotation of the reverse conveyance rollers 24 is started in the post-reversal rotation direction R2 in step S314 of FIG. 8.

The termination time of the stop timer is set to a timing when the second end of the sheet being conveyed is conveyed to a predetermined distance past the in-body discharge rollers 26. In the case where a plurality of sheets are buffered by being held by the in-body discharge rollers 26, the stop timer is set with respect to the second end of the uppermost sheet.

In step S410, a standby state is maintained while counting down the activation timer. When the countdown is finished, rotation of the in-body discharge rollers 26 is started at the target speed V2 in the rotation direction R4 following the backward conveyance direction in the in-body discharge path 82 in step S411. As a result of this, the sheet being buffered is conveyed in the backward conveyance direction, and is superimposed at the predetermined offset amount k on the sheet being conveyed fed from the pre-buffer rollers 22 as illustrated in FIGS. 4A and 4B. In addition, the conveyance speed V2 at which the in-body discharge rollers 26 convey the sheet in the backward conveyance direction is equal to the conveyance speed at which the pre-buffer rollers 22 deliver the sheet into the reverse conveyance rollers 24.

In step S412, a standby state is maintained while counting down the reverse conveyance timer. When the countdown is finished, in step S413, the in-body discharge rollers 26 are temporarily stopped, the rotation direction of the in-body discharge rollers 26 is reversed from the reverse rotation direction R4 to the normal rotation direction R3, and the in-body discharge rollers 26 are reactivated at the target speed V2. This reversing operation of the in-body discharge rollers 26 is performed in synchronization with the reversing operation of the reverse conveyance rollers 24 performed in step S314 of FIG. 8. As a result of this, the sheet being conveyed and the sheet being buffered are passed onto the in-body discharge rollers 26 from the reverse conveyance rollers 24 in a superimposed state as illustrated in FIG. 4C.

In step S414, a standby state is maintained while counting down the stop timer. When the countdown is finished, whether or not to continue the buffering operation, that is, whether or not the sheet that reaches the in-body discharge rollers 26 next is also a buffering target, is determined in step S415. In the case of continuing the buffering operation, the in-body discharge rollers 26 are stopped in step S416 on the basis of the termination of the stop timer, and the process returns to step S401 and is continued. In this case, processing of steps S409 to S414 is repeated on the next sheet, and thus three or more sheets are superimposed on one another in the buffering portion. In the case where the buffering operation is not to be continued, the stop timer is reset in step S417, and the rotation of the in-body discharge rollers 26 is continued. The termination time of the reset stop timer is set to a timing after the trailing end of the sheet in the in-body discharge path 82, that is, the first end of the sheet being conveyed has passed through the in-body discharge rollers 26. In this case, a standby state is taken while counting down the stop timer in step S418, and when the countdown is finished, the in-body discharge rollers 26 are stopped. In step S420, whether or not the sheet being conveyed is the final sheet is determined. In the case where the sheet is not the final sheet, the process returns to step S401 and is continued. In the case where the sheet is the final sheet, the operation sequence is finished.

Steps S421 to S423 correspond to an operation performed on a sheet that is not a buffering target. In this case, the in-body discharge rollers 26 simply convey the sheet received from the reverse conveyance rollers 24 in the forward conveyance direction toward the binding processing portion 4A without conveying the sheet in the backward conveyance direction. That is, in step S421, each timer is set on the basis of the timing at which the entrance sensor 27 has detected the passage of the trailing end of the sheet in step S401.

The termination time of the activation timer is set to such a timing that the in-body discharge rollers 26 can be accelerated to the target speed V2 before the sheet reversed by the reverse conveyance rollers 24 reaches the in-body discharge rollers 26.

The termination time of the stop timer is set to a timing after the trailing end of the sheet in the in-body discharge path 82 passes through the in-body discharge rollers 26.

In step S422, a standby state is maintained while counting down the activation timer, and when the countdown is finished, in step S423, rotation of the in-body discharge rollers 26 is started at the target speed V2 in the rotation direction R3 following the forward conveyance direction in the in-body discharge path 82. Then, a standby state is maintained while counting down the stop timer in step S418, and when the countdown is finished, the in-body discharge rollers 26 are stopped in step S419. In step S420, whether or not the sheet being conveyed is the final sheet is determined. In the case where the sheet is not the final sheet, the process returns to step S401 and is continued, and in the case where the sheet is the final sheet, the operation sequence is finished.

Binding Processing Portion

Figure 10A:
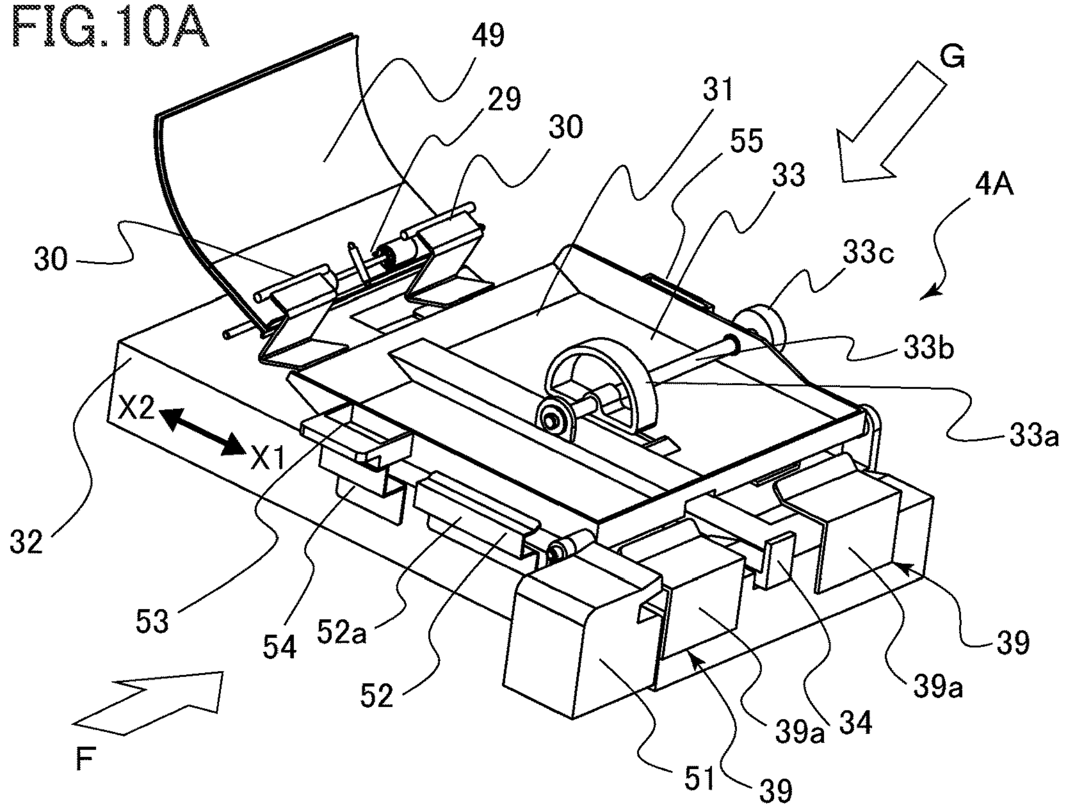
FIG. 10A is a perspective view of a binding processing portion according to the first exemplary embodiment.

Next, the binding processing portion 4A will be described. FIG. 10A is a perspective view of the binding processing portion 4A, and FIG. 10B is a perspective view of the binding processing portion 4A in a state in which the intermediate upper guide 31 is opened.

Figure 10B:
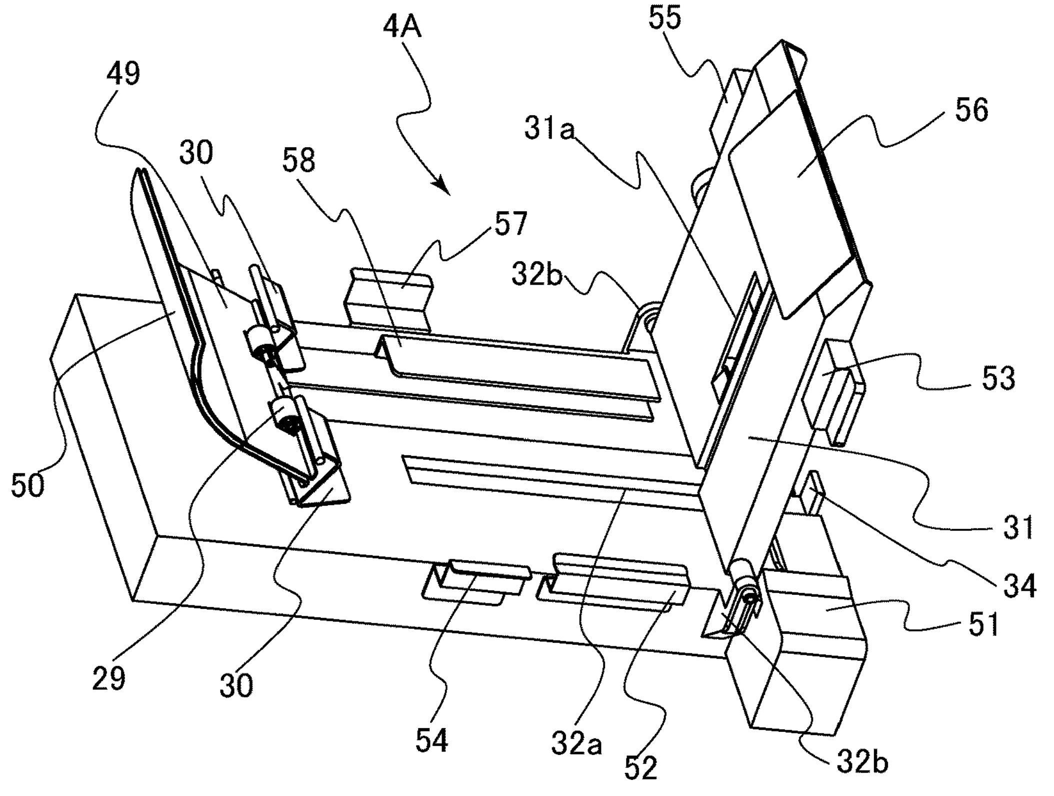
FIG. 10B is a perspective view of the binding processing portion in a state in which an intermediate upper guide is open.

As illustrated in FIGS. 10A and 10B and the schematic diagram of FIG. 1, the binding processing portion 4A includes the stapler 51, the intermediate upper guide 31, the intermediate lower guide 32, longitudinal alignment standard plates 39, a longitudinal alignment roller 33, a bundle discharge guide 34, and a guide driving portion 35. The binding processing portion 4A performs, by the stapler 51, a binding process on sheets discharged from the in-body discharge path 82 and supported on an intermediate supporting portion, and thus forms a bound sheet bundle.

The intermediate upper guide 31 and the intermediate lower guide 32 constitute an intermediate supporting portion on which sheets to be processed are supported. The intermediate lower guide 32 serves as a supporting portion for sheets discharged by the kick-out rollers 29, which are the most downstream rollers in the in-body discharge path 82.

Bundle pressing flags 30 are pivotably provided downstream of the kick-out rollers 29. The lower surface of the bundle pressing flags 30 presses the trailing end of a preceding sheet having been previously discharged onto the intermediate supporting portion, and thus allows the leading end of the subsequent sheet discharged later by the kick-out rollers 29 to pass through a space above the trailing end of the preceding sheet. That is, the bundle pressing flags 30 function as means for moving the trailing end of a sheet discharged from the kick-out rollers 29 downward to prevent collision between sheets. The lower surface of the bundle pressing flags 30 is provided in such a range in the sheet width direction that both end portions in the sheet width direction of sheets of respective sizes that can be processed by the binding processing portion 4A can be pressed.

The longitudinal alignment roller 33 serving as a moving member of the present exemplary embodiment is provided above the intermediate lower guide 32. The longitudinal alignment roller 33 includes a roller portion 33*a* formed from an elastic material such as a synthetic rubber or an elastomer resin and adjusted such that the outer peripheral surface thereof has a predetermined friction coefficient. The roller portion 33*a* is supported by a shaft portion 33*b* rotatably supported by the intermediate upper guide 31, and is driven to intermittently rotate once at a time by a drive transmission device including a gear portion 33*c*. The roller portion 33*a* serving as an outer peripheral portion of the longitudinal alignment roller 33 has a noncircular shape as viewed in the axial direction of the shaft portion 33*b*. In a standby state before the sheet is discharged onto the intermediate supporting portion, the longitudinal alignment roller 33 is held at such a rotation angle that the roller portion 33*a* is not exposed from the intermediate upper guide 31. In addition, while the longitudinal alignment roller 33 rotates once, the roller portion 33*a* is temporarily exposed through an opening portion 31*a* provided in the intermediate upper guide 31, and comes into contact with an upper surface of the uppermost sheet of the sheets supported on the intermediate lower guide 32 to apply a conveyance force to the sheet. The contact pressure of the longitudinal alignment roller 33 on the sheet is adjusted such that the longitudinal alignment roller 33 slips after the sheet abuts the longitudinal alignment standard plates 39.

The intermediate supporting portion is provided with a pressing guide 56 that is a flexible sheet member. The pressing guide 56 is disposed to abut the intermediate lower guide 32, and presses the upper surface of a sheet supported on the intermediate supporting portion by a predetermined pressurizing force.

The longitudinal alignment standard plates 39 serving as regulating members of the present exemplary embodiment are provided downstream of the longitudinal alignment roller 33 in the sheet discharge direction of the kick-out rollers 29. The longitudinal alignment standard plates 39 each include, as a regulating portion that abuts an end portion of the sheet, a standard wall 39*a* that projects upward from the upper surface of the intermediate lower guide 32. In addition, the two longitudinal alignment standard plates 39 of the present exemplary embodiment are provided on both sides in a direction perpendicular to the sheet discharge direction, that is, in the sheet width direction.

In the description below, a direction in which the sheet discharged by the kick-out rollers 29 moves toward the longitudinal alignment standard plates 39 in the binding processing portion 4A will be referred to as a "longitudinal alignment direction X1". The longitudinal alignment direction X1 is a direction following the forward conveyance direction in the in-body discharge path 82, and is a direction in which the longitudinal alignment roller 33 moves a sheet toward the longitudinal alignment standard plates 39. In addition, a direction opposite to the longitudinal alignment direction X1, that is, a direction in which a sheet bundle is discharged from the binding processing portion 4A will be referred to as a "bundle discharge direction X2".

The stapler 51 performs a binding process at a predetermined position on a plurality of sheets supported on the intermediate supporting portion and aligned in the longitudinal alignment direction X1 and the sheet width direction. The stapler 51 of the present exemplary embodiment is provided on the same side as a lateral alignment standard plate 52 in the sheet width direction, and is provided so as to be movable in the longitudinal alignment direction X1 and in the bundle discharge direction X2. In addition, the intermediate lower guide 32 is large enough to support sheets of A4 size thereon conveyed thereto in a long side feeding direction in which the longitudinal alignment direction X1 is parallel to a long side direction and the sheet width direction is parallel to a short side direction. Therefore, the stapler 51 can perform not only corner binding in which a corner portion of the sheet bundle supported on the intermediate supporting portion is stapled but also long side binding in which the stapler 51 staples a plurality of positions along the long side of the sheet bundle while moving with respect to the sheet bundle.

Figures 19A, 19B, 19C, 19D:
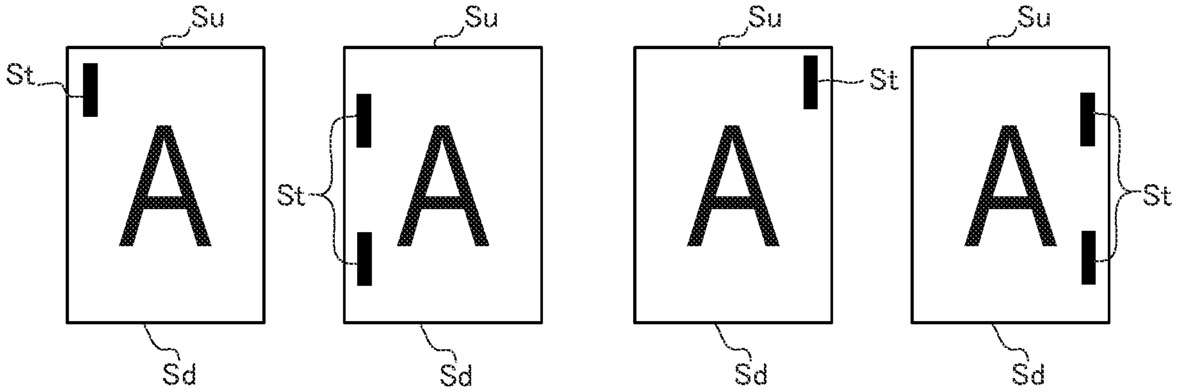
FIGS. 19A to 19D are diagrams illustrating examples of a binding process.

Specific binding positions of the sheets will be described with reference to FIGS. 19A to 19D. In examples illustrated in FIGS. 19A to 19D, the image forming apparatus 1 and the post-processing apparatus 4 convey the sheets in the long side conveyance direction, and the vertical direction in the drawing corresponds to the long side direction of the sheets. FIG. 19A illustrates a result in which the binding process is performed on sheets, on which images have been printed from the lower end Sd side to the upper end Su side of the sheets in the image forming apparatus 1, at a position 51*a* indicated by a solid line in FIG. 1 which is a position on the side closer to the longitudinal alignment standard plates 39. In this case, the upper end Su of the sheets will be a leading end of the sheets in the forward conveyance direction in the in-body discharge path 82. Then, the stapler 51 performs the binding process at the position 51*a* of FIG. 1 in a state in which the side of the sheets on which images have been printed faces down to face the intermediate lower guide 32 and the upper end Su of the sheets abuts the longitudinal alignment standard plates 39, and thus a sheet bundle stapled at an upper left corner binding position St in the image surface is formed as illustrated in FIG. 19A. In addition, in the case where the binding process is performed at two binding positions St while moving the stapler 51 along the sheet conveyance direction on sheets on which images have been printed from the lower end Sd side to the upper end Su side of the sheets, a sheet bundle whose left end portion is bound is formed as illustrated in FIG. 19B.

Meanwhile, FIG. 19C illustrates a result in which the binding process is performed on sheets, on which images have been printed from the upper end Su side to the lower end Sd side of the sheets in the image forming apparatus 1, at a position 51*b* indicated by a broken line in FIG. 1 which is a position on the side farther from the longitudinal alignment standard plates 39. The lower end Sd of the sheets will be a leading end of the sheets in the forward conveyance direction in the in-body discharge path 82. Then, the stapler 51 performs the binding process at the position 51*b* of FIG. 1 in a state in which the side of the sheets on which images have been printed faces down and the lower end Sd of the sheets abuts the longitudinal alignment standard plates 39, and thus a sheet bundle stapled at an upper right corner binding position St in the image surface is formed as illustrated in FIG. 19C. In addition, in the case where the binding process is performed at two binding positions St while moving the stapler 51 along the sheet conveyance direction on sheets on which images have been printed from the upper end Su side to the lower end Sd side of the sheets, a sheet bundle whose right end portion is bound is formed as illustrated in FIG. 19D.

To be noted, the stapler 51 is not limited to a stapler that binds sheets by using staples, and a system that binds sheets without using a staple may be used. For example, a system that causes compression bonding between sheets by nipping the sheets between concave and convex surfaces, or a system that cuts the sheets into a U shape and folding the U-shaped portion may be used.

A bundle discharge guide 34 is provided between the two longitudinal alignment standard plates 39 as a pushing member that pushes out processed sheets from the intermediate supporting portion. The bundle discharge guide 34 is attached to a guide driving portion 35 illustrated in FIG. 1, and can move in the bundle discharge direction X2 serving as a discharge direction and in the longitudinal alignment direction X1. In addition, a slide groove 32*a* that guides movement of the bundle discharge guide 34 is defined in the intermediate lower guide 32 as illustrated in FIG. 10B.

The lateral alignment standard plate 52 is fixed to the intermediate lower guide 32, and a lateral alignment jogger 58 is provided so as to be movable in the sheet width direction with respect to the lateral alignment standard plate 52. The lateral alignment standard plate 52 includes a standard wall 52*a* projecting upward from the upper surface of the intermediate lower guide 32 and extending along the longitudinal alignment direction X1, and is opposed to the lateral alignment jogger 58 in the sheet width direction.

The intermediate upper guide 31 is supported so as to be pivotable, that is, openable and closable, about a support portion 32*b* of the intermediate lower guide 32 with respect to the intermediate lower guide 32. Abutting plates 54 and 57 fixed to the intermediate lower guide 32 respectively abut an opening/closing handle 53 and a fixing plate 55 of the intermediate upper guide 31, and thus position the intermediate upper guide 31 with respect to the intermediate lower guide 32. The abutting plates 54 and 57 are formed from a magnetizable metal such as iron, the opening/closing handle 53 and the fixing plate 55 include magnet therein, and movement of the intermediate upper guide 31 is restricted by a magnetic force. The opening/closing handle 53 is provided at a position that can be accessed when, for example, an opening/closing cover provided on the front side of a casing of the post-processing apparatus 4 is opened. Therefore, when a jam of sheet has occurred in the binding processing portion 4A, the user can open the opening/closing cover, grip the opening/closing handle 53, and thus open the intermediate upper guide 31 to remove the jammed sheet.

To be noted, instead of the fixing mechanism using magnets, a snap fit mechanism in which a claw shape formed from a resin material is provided on one of the intermediate upper guide 31 and the intermediate lower guide 32 and a recess portion that engages with the claw shape is provided on the other guide may be used. In addition, as another example of a fixing mechanism, the relative movement between the intermediate upper guide 31 and the intermediate lower guide 32 may be restricted by providing a bar-like projection, that is, a dowel, on one of the intermediate upper guide 31 and the intermediate lower guide 32 and providing a hook that engages with this projection on the other guide.

As illustrated in FIG. 5, the post-processing apparatus 4 includes a longitudinal alignment motor M6, a jogger driving motor M7 serving as a lateral alignment motor, a stapler moving motor M8, a binding motor M9, a guide driving motor M10, and a bundle discharge motor M11 mainly as drive sources related to the operation of the binding processing portion 4A. The longitudinal alignment motor M6 supplies a driving force that causes the longitudinal alignment roller 33 to operate intermittently to rotate once at a time. The jogger driving motor M7 moves the lateral alignment jogger 58 in the sheet width direction. The stapler moving motor M8 moves the stapler 51 in the longitudinal alignment direction X1 and the bundle discharge direction X2. The binding motor M9 causes the stapler 51 to perform the operation of binding a sheet bundle. The guide driving motor M10 drives the guide driving portion 35 to slide the bundle discharge guide 34. The bundle discharge motor M11 rotationally drives the bundle discharge rollers 36.

Operation of Binding Processing Portion

An operation of the binding processing portion 4A aligning sheets and binding a sheet bundle by the stapler 51 will be described below. To be noted, FIGS. 11A, 11C, 12A, 12C, 13A, 13C, 14A, and 14B are side views as viewed in a direction of an arrow F of FIG. 10A, that is, the sheet width direction. In addition, FIGS. 11B, 11D, 12B, 12D, 13B, and 13D are top views as viewed in a direction of an arrow G of FIG. 10A.

Figure 11A:
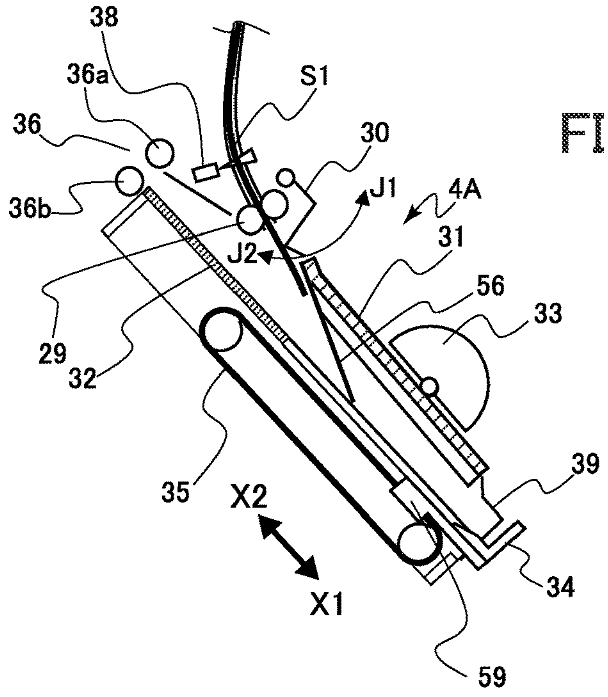
FIGS. 11A to 11D are diagrams for describing an operation of the binding processing portion according to the first exemplary embodiment.
Figure 11B:
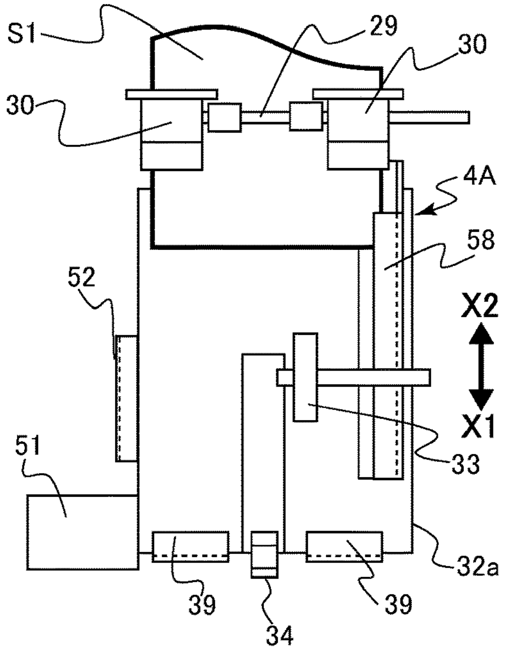

FIGS. 11A and 11B illustrate a state in which the first sheet S1 is about to be discharged to the binding processing portion 4A. The kick-out rollers 29 are nipping the sheet S1 and discharging the sheet S1 onto the intermediate supporting portion. In addition, the bundle pressing flags 30 have pivoted in a J1 direction by being pressed by the sheet S1, and is thus retracted from a discharge path of the sheet. The sheet S1 passes through a space between the lateral alignment jogger 58 and the lateral alignment standard plate 52 that are at standby positions in the width direction, and moves in the longitudinal alignment direction X1.

Figure 11C:
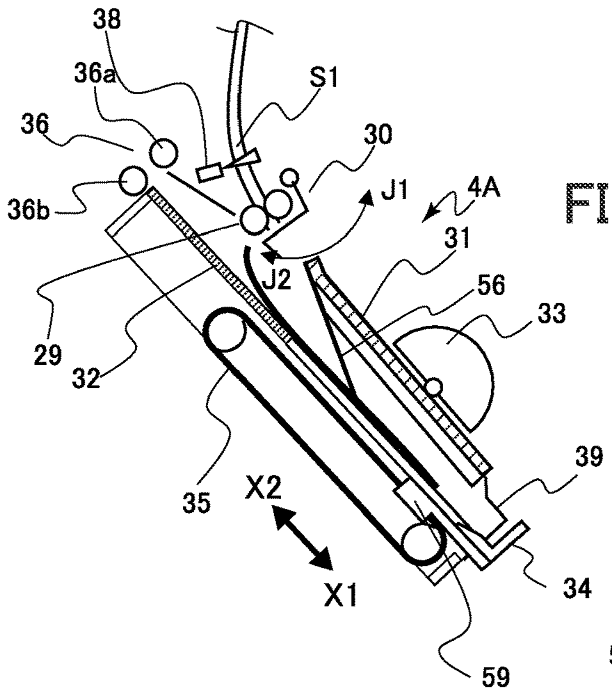
Figure 11D:
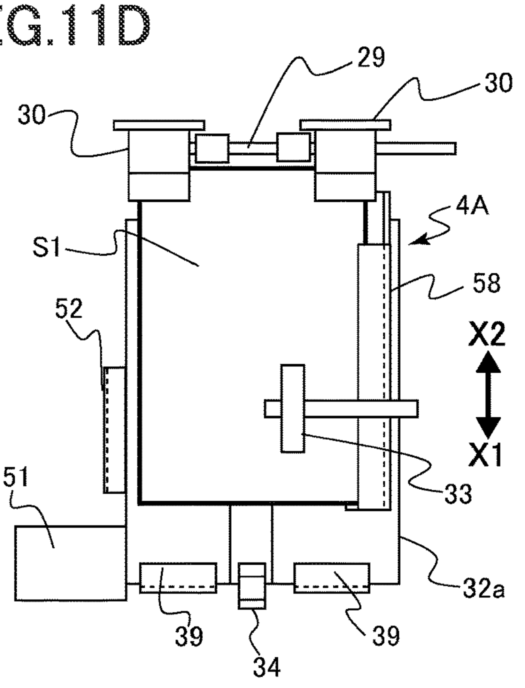

FIGS. 11C and 11D illustrate a state immediately after the trailing end of the first sheet S1 in the longitudinal alignment direction X1 has been released from the kick-out rollers 29. As a result of the sheet S1 being released from the nip of the kick-out rollers 29, the bundle pressing flags 30 pivot in a J2 direction, and lower the trailing end of the sheet S1 to a position lower than the nip position of the kick-out rollers 29. At this time, the sheet S1 is nipped between the pressing guide 56 and the intermediate lower guide 32. In addition, at the time when the trailing end of the sheet is released from the kick-out rollers 29, the leading end of the sheet S1 in the longitudinal alignment direction X1 has advanced to a position under the longitudinal alignment roller 33.

Figure 12A:
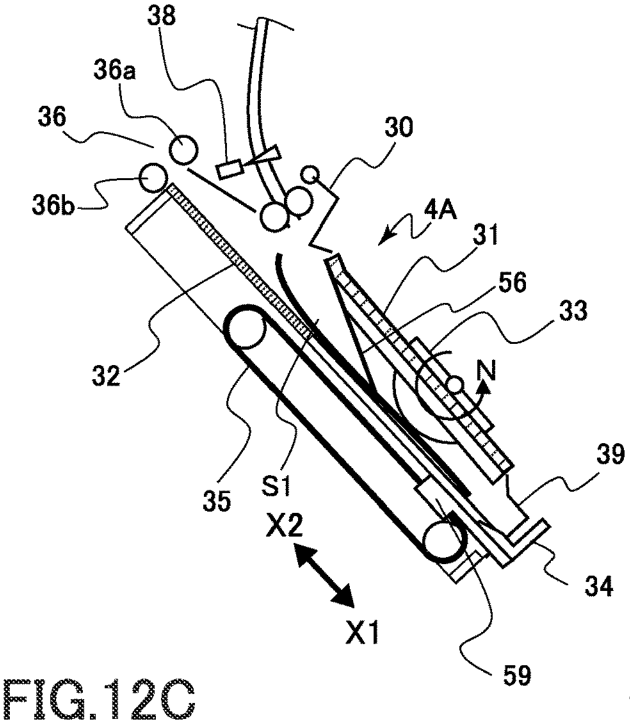
FIGS. 12A to 12D are diagrams for describing an operation of the binding processing portion according to the first exemplary embodiment.
Figure 12B:
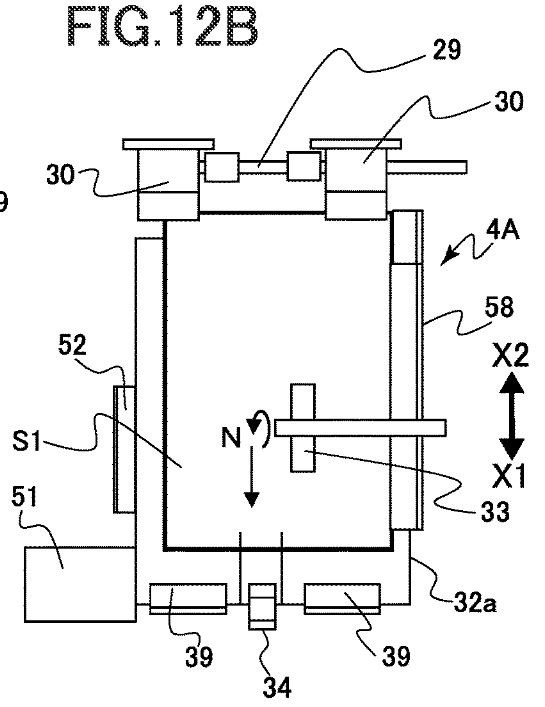

As illustrated in FIGS. 12A and 12B, after the trailing end of the sheet S1 has been released from the kick-out rollers 29, the roller portion of the longitudinal alignment roller 33 rotating in an N direction comes into contact with the sheet S1, and moves the sheet S1 in the longitudinal alignment direction X1. As a result of this, the leading end of the sheet S1 abuts the longitudinal alignment standard plates 39, and thus the position of the sheet S1 is aligned in the longitudinal alignment direction X1.

Figure 12C:
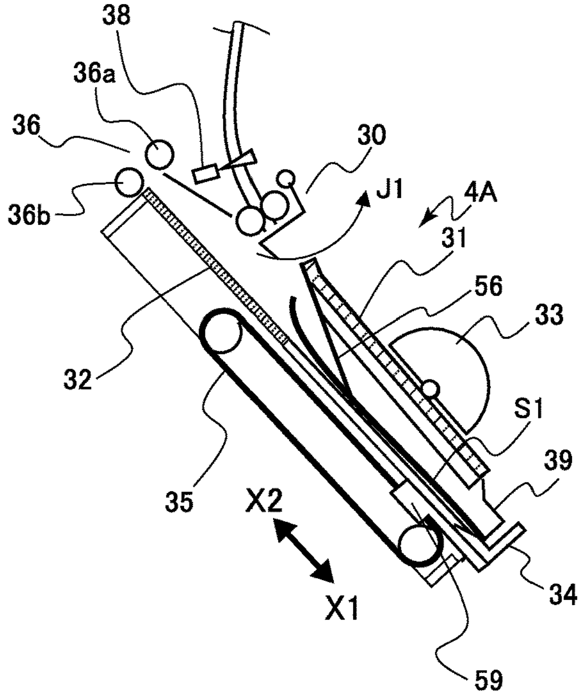
Figure 12D:
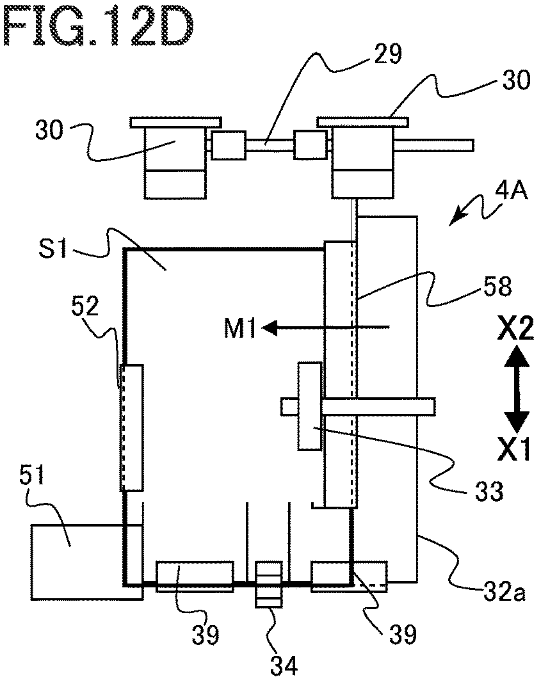

As illustrated in FIGS. 12C and 12D, the lateral alignment jogger 58 moves in an M1 direction and moves the sheet S1 toward the lateral alignment standard plate 52 after the longitudinal alignment roller 33 is separated from the sheet S1. As a result of this, an end portion of the sheet S1 in the sheet width direction, that is, a side edge of the sheet S1 abuts the lateral alignment standard plate 52, and the position of the sheet S1 is aligned in the sheet width direction, that is, in the lateral direction.

Figure 13A:
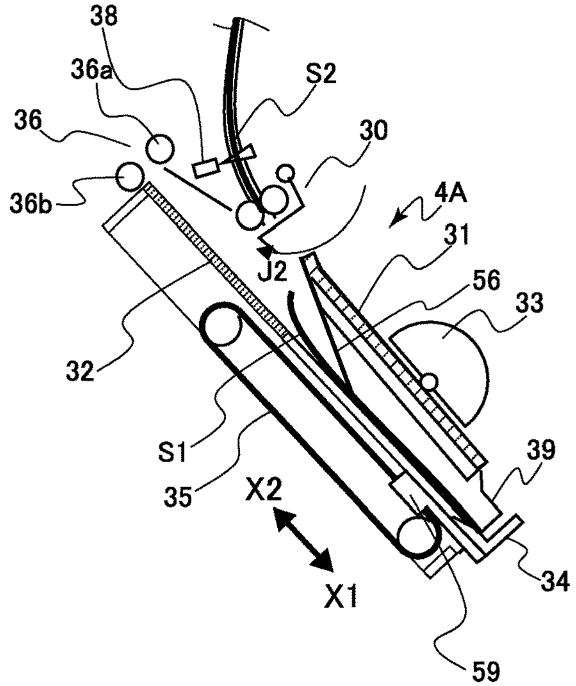
FIGS. 13A to 13D are diagrams for describing an operation of the binding processing portion according to the first exemplary embodiment.
Figure 13B:
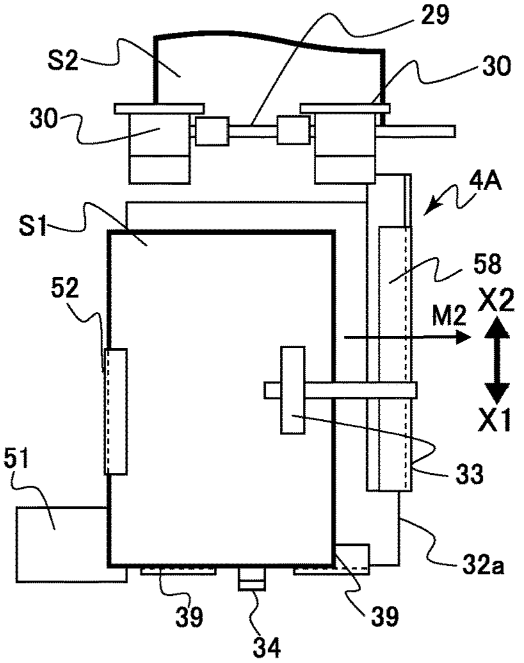

As illustrated in FIGS. 13A and 13B, when the alignment of the sheet S1 in the lateral direction is finished, the lateral alignment jogger 58 moves in an M2 direction to return to a standby position. As a result of this, it becomes possible for the binding processing portion 4A to receive the next sheet S2. To be noted, although description has been given on the premise that the discharge of the sheet S2 by the kick-out rollers 29 is started after the lateral alignment jogger 58 has returned to the standby position, the discharge of the sheet S2 may be started before the lateral alignment jogger 58 returns to the standby position. In this case, for example, the sheet S2 is discharged while sliding on the upper surface of the lateral alignment jogger 58, and when the lateral alignment jogger 58 returns to the standby position, the sheet S2 drops onto the upper surface of the intermediate lower guide 32 from the upper surface of the lateral alignment jogger 58.

After this, the operation of FIGS. 12A to 13B is repeated until the alignment of the final sheet constituting a sheet bundle of one copy is completed. Then, when the alignment operation on the final sheet in the longitudinal direction and the lateral direction is completed, the stapler 51 staples a predetermined position on the sheet bundle.

Figure 13C:
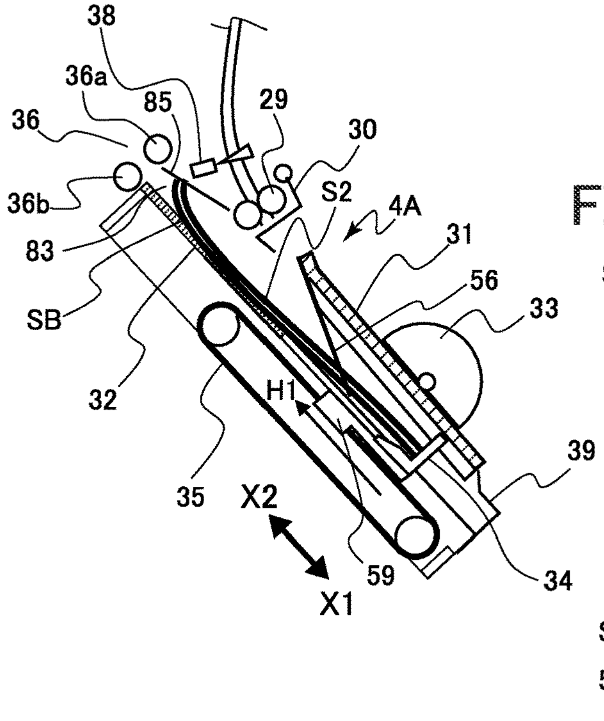
Figure 13D:
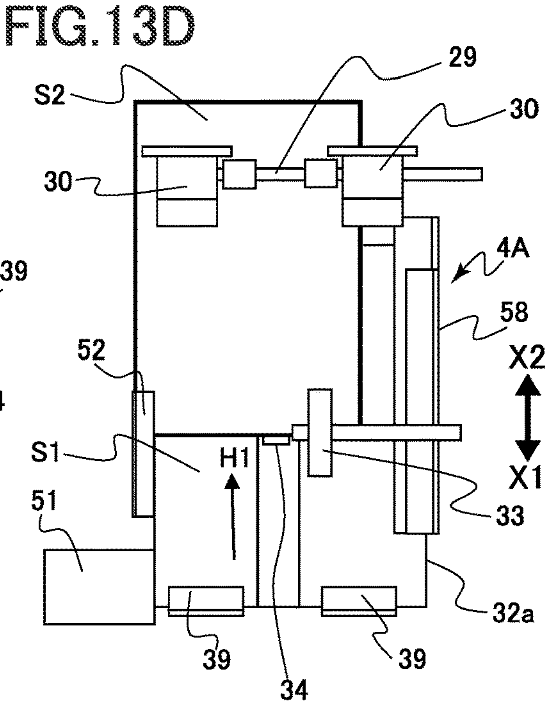

As illustrated in FIGS. 13C and 13D, when the binding operation is performed by the stapler 51, driving of the guide driving portion 35 is started, and the bundle discharge guide 34 connected to the guide driving portion 35 via a base member 59 moves in an H1 direction. As a result of this, a bound sheet bundle SB is pushed in the bundle discharge direction X2 toward bundle discharge rollers 36. At this time, an upper roller 36*a* and a lower roller 36*b* of the bundle discharge rollers 36 are separated from each other. In addition, the sheet bundle SB is guided to the bundle discharge rollers 36 by an upstream portion of the discharge upper guide 85 and the intermediate lower guide 32 constituting the second discharge path 84. The upstream portion is a portion extending to the downstream side in the bundle discharge direction X2 with respect to the kick-out rollers 29.

Figure 14A:
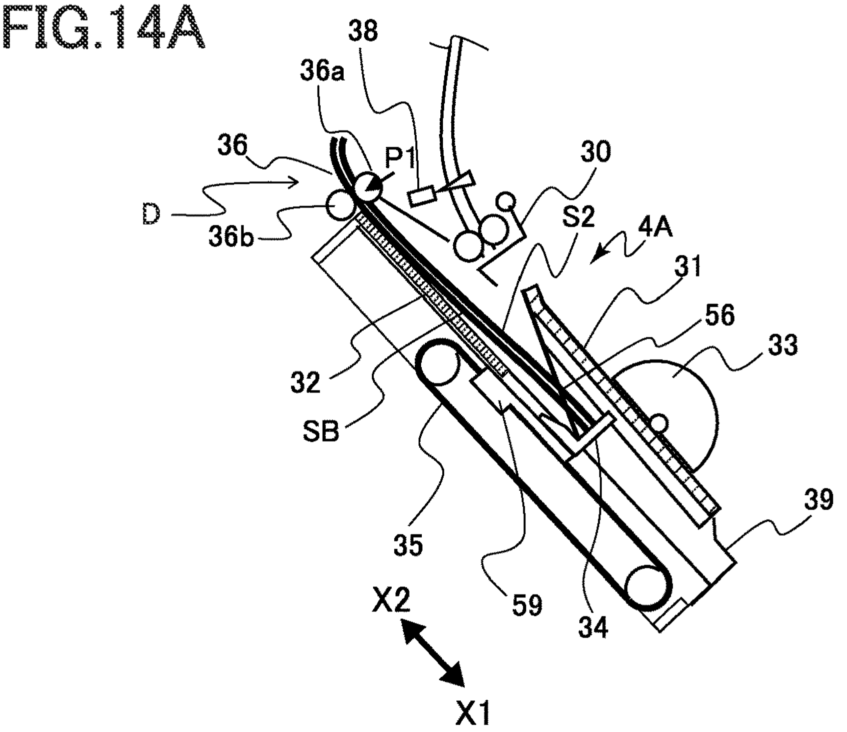
FIGS. 14A and 14B are diagrams for describing an operation of the binding processing portion according to the first exemplary embodiment.

As illustrated in FIG. 14A, when the leading end of the sheet bundle SB in the bundle discharge direction X2 reaches the bundle discharge rollers 36, the bundle discharge guide 34 is temporarily stopped. Then, the upper roller 36*a* moves in a P1 direction, and the bundle discharge rollers 36 abut each other. The bundle discharge guide 34 starts moving in the bundle discharge direction X2 again in accordance with start of rotation of the bundle discharge rollers 36. As a result of this, the sheet bundle SB is nipped by the bundle discharge rollers 36, and is continued to be discharged in the bundle discharge direction X2 by the bundle discharge rollers 36.

Figure 14B:
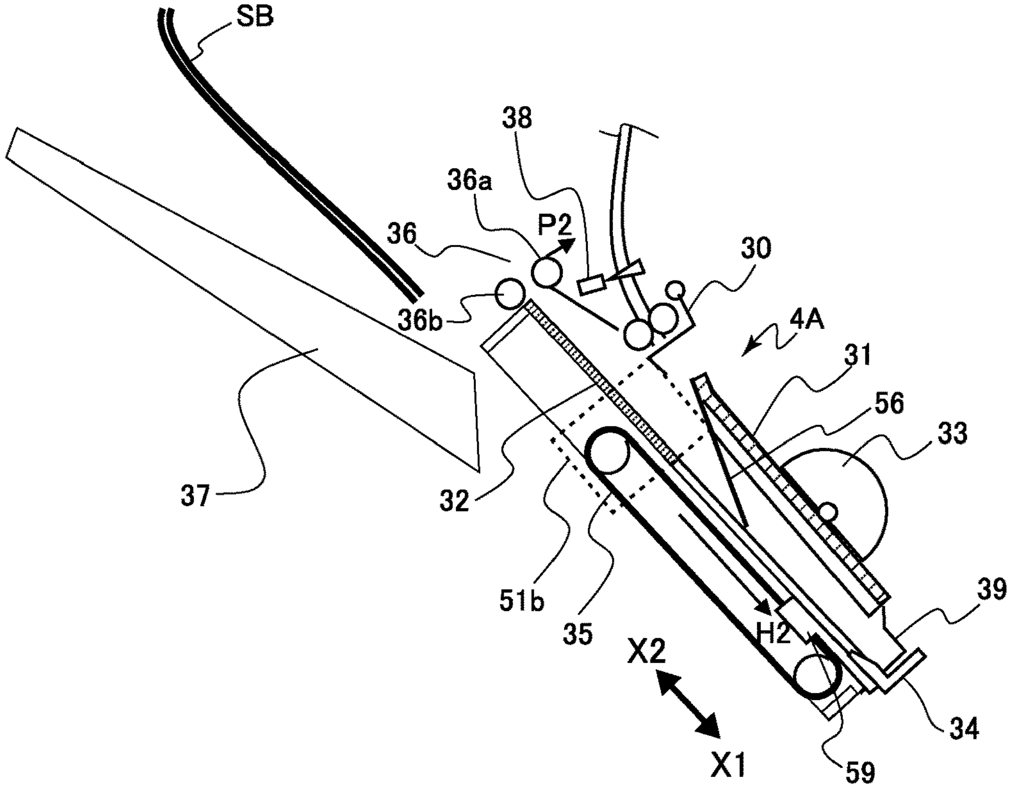

As illustrated in FIG. 14B, when the trailing end of the sheet bundle SB in the bundle discharge direction X2 is released from the bundle discharge rollers 36, the upper roller 36*a* moves in a P2 direction, and the bundle discharge rollers 36 are separated from each other again. The sheet bundle SB discharged to the outside of the post-processing apparatus 4 by the bundle discharge rollers 36 is supported on the lower discharge tray 37. In addition, the bundle discharge guide 34 moves in the longitudinal alignment direction X1 and returns to the standby position of FIG. 11A, and thus it becomes possible for the binding processing portion 4A to receive the next sheet.

As described above, in the present exemplary embodiment, sheets are discharged in the longitudinal alignment direction X1 onto the intermediate supporting portion by the kick-out rollers 29 serving as a conveyance roller pair that nips and conveys a sheet. Then, by further moving the sheets in the longitudinal alignment direction X1 by the longitudinal alignment roller 33 serving as a moving member that comes into contact with the upper surface of the sheets, the sheets are caused to abut the standard walls 39*a* serving as regulating portions.

As described above, the movement region of the stapler 51 is provided upstream of the bundle discharge rollers 36 disposed at a boundary portion between the inside and outside of the casing of the post-processing apparatus 4 in the movement direction of the stapler 51, which is the bundle discharge direction X2 in this case. According to this configuration, since no structure such as the stapler 51 or the driving mechanism for the stapler 51 is present in the space above the lower discharge tray 37, sheets supported on the lower discharge tray 37 can be easily picked up.

In addition, the hand of the user or the picked up sheets erroneously touching the sheets being aligned or the stapler 51 can be avoided when picking up the sheets supported on the lower discharge tray 37. Therefore, occurrence of alignment error derived from the user or hindrance of the operation of the stapler 51 can be avoided. Further, setting the amount of separation between the bundle discharge rollers 36 to a minimum required value is more effective because access to the sheets being aligned or access to the stapler 51 from the discharge portion can be avoided more reliably.

That is, the bundle discharge rollers 36 also serve as a blocking portion that hinders entrance of an object from the outside to the inside of the post-processing apparatus 4.

Incidentally, as a system for aligning sheets on the intermediate supporting portion, that is, a processing tray of the post-processing apparatus, a configuration in which a sheet conveyance direction of a conveyance roller pair discharging sheets onto the intermediate supporting portion is different from the longitudinal alignment direction X1 of the sheets on the intermediate supporting portion is known. That is, a configuration in which the conveyance roller pair is provided above the intermediate supporting portion, and after a sheet is discharged to the upstream side in the longitudinal alignment direction X1, the sheet having dropped onto the intermediate supporting portion is moved toward the longitudinal alignment standard plates 39 by an alignment member that comes into contact with the upper surface of the sheet like the longitudinal alignment roller 33 is known. However, according to this configuration, sometimes the distance by which the longitudinal alignment roller 33 moves the sheet toward the longitudinal alignment standard plates 39 becomes large, for example, 50 mm or more, and sufficient alignment precision may not be achieved by the longitudinal alignment roller 33 that only comes into contact with one surface of the sheet. However, for example, if the contact pressure of the longitudinal alignment roller 33 on the sheet is increased to increase the conveyance force applied to the sheet, crumpling of the sheet can occur between the longitudinal alignment roller 33 and the longitudinal alignment standard plates 39.

In contrast, in the present exemplary embodiment, the direction in which the kick-out rollers 29 that nip and convey the sheet discharge the sheet is aligned with the direction in which the longitudinal alignment roller 33 that comes into contact with one surface of the sheet causes the sheet to abut the longitudinal alignment standard plates 39, that is, the longitudinal alignment direction X1. Therefore, the conveyance quota of the longitudinal alignment roller 33 that comes into contact with one surface of the sheet can be reduced, and thus the alignment precision can be improved while avoiding crumpling of the sheet. That is, the sheet can be conveyed to a position where the leading end of the sheet in the longitudinal alignment direction X1 is sufficiently close to the longitudinal alignment standard plates 39, for example, to a position 20 mm to the longitudinal alignment standard plates 39, by the kick-out rollers 29 that nip the sheet. Then, the sheet can be caused to abut the longitudinal alignment standard plates 39 just by bringing the longitudinal alignment rollers 33 into contact with the upper surface of the sheet and moving the sheet by a small distance.

Offset Amount of Buffered Sheets and Alignment Operation in Binding Processing Portion Next, the relationship between the offset amount k in the buffering portion 4B and the alignment operation in the binding processing portion 4A will be described.

Figure 15:
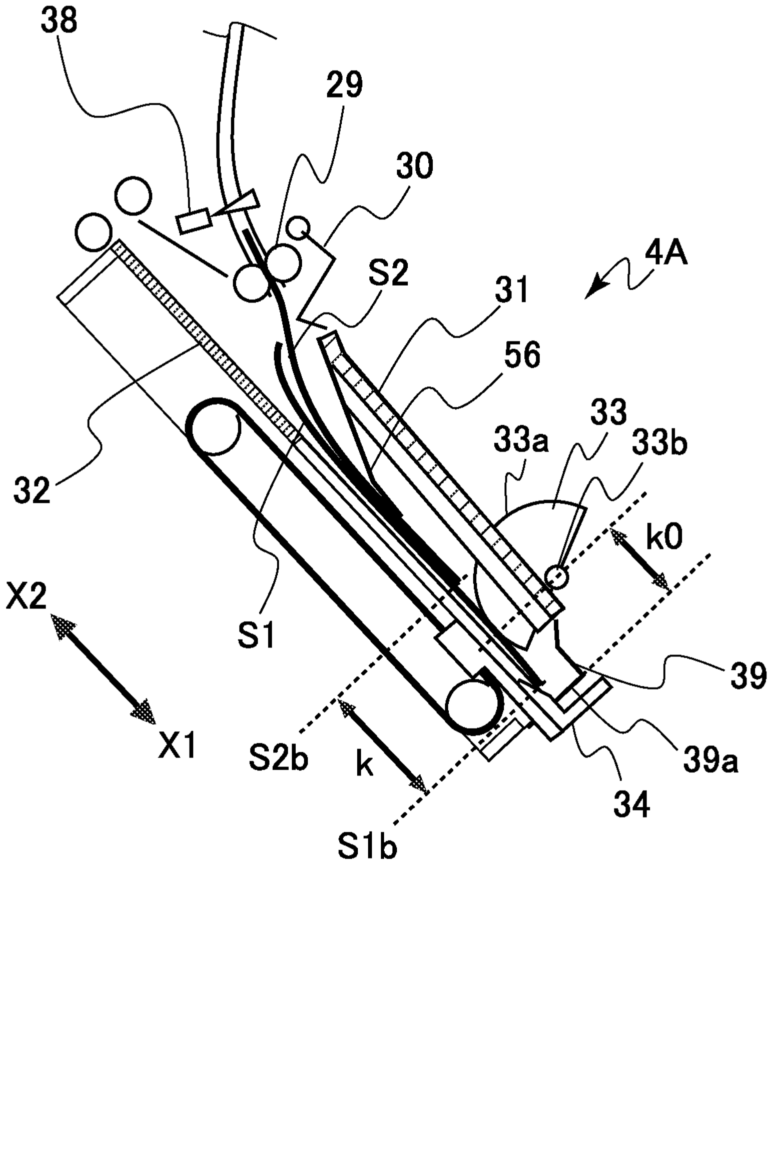
FIG. 15 is a diagram for describing a relationship between an offset amount of the buffering portion according to the first exemplary embodiment and the alignment operation of the binding processing portion.

FIG. 15 illustrates a state immediately after the trailing end of the first sheet S1 in the longitudinal alignment direction X1 has been released from the kick-out rollers 29 in the case where sheets to be conveyed to the binding processing portion 4A are the sheets S1 and S2 superimposed in the buffering portion 4B. At this time, the second sheet S2 that is to be superimposed on the sheet S1 on the intermediate supporting portion is nipped by the kick-out rollers 29. In addition, the leading end of the sheet S1 in the longitudinal alignment direction X1 has not reached the standard walls 39*a* of the longitudinal alignment standard plates 39, and is subjected to a conveyance force in the longitudinal alignment direction X1 from the roller portion 33*a* of the longitudinal alignment roller 33.

Here, the distance between a sheet contact position of the longitudinal alignment roller 33 and the standard walls 39*a* of the longitudinal alignment standard plates 39 in the longitudinal alignment direction X1 is set as k0. Hereinafter, this distance will be referred to as a "distance from the longitudinal alignment roller 33 to the longitudinal alignment standard plates 39". To be noted, the sheet contact position of the longitudinal alignment roller 33 is a position in the longitudinal alignment direction X1 that can be regarded as a point of action where the roller portion 33*a* of the longitudinal alignment roller 33 applies a conveyance force to the sheet, and is equal to the axial center of the shaft portion 33*b* in the present exemplary embodiment.

As described above, when superimposing a plurality of sheets in the buffering portion 4B, the buffering operation is controlled such that the sheets are each offset from one another by the predetermined offset amount k in the sheet conveyance direction. The offset amount k corresponds to the length by which the leading end S1*b* of the first sheet S1 among two sheets superimposed in the vertical direction on the intermediate supporting portion projects to the downstream side in the longitudinal alignment direction X1 with respect to the leading end S2*b* of the second sheet S2 superimposed thereon.

In this case, if it is attempted to align the sheets superimposed in the buffering portion by a rotary member that comes into only the upper surface of a sheet like the longitudinal alignment roller 33, there is a difference between the sheet in contact with the rotary member and the sheet not in contact with the rotary member in the conveyance force that the sheet receives. As a result, it has been conventionally difficult to suppress occurrence of a jam while maintaining the alignment precision of each of the plurality of sheets superimposed in the buffering portion.

In the present exemplary embodiment, the offset amount k is set to a value larger than the distance k0 from the longitudinal alignment roller 33 to the longitudinal alignment standard plates 39, that is, k>k0 holds. In the description below, it will be explained that the precision of the alignment operation by the longitudinal alignment roller 33 can be improved and occurrence of a jam in the binding processing portion 4A can be suppressed at the same time by setting the offset amount k to such a value.

In the present exemplary embodiment, since the offset amount k is larger than the distance k0, as illustrated in FIG. 15, normally the leading end S2*b* of the sheet S2 is positioned upstream of the sheet contact position of the longitudinal alignment roller 33 before the leading end S1*b* of the sheet S1 abuts the longitudinal alignment standard plates 39. When the longitudinal alignment roller 33 rotates in this state, the roller portion 33*a* comes into contact with the first sheet S1 at the sheet contact position, and imparts the conveyance force in the longitudinal alignment direction X1. Then, after the first sheet S1 has abutted the longitudinal alignment standard plates 39 and the sheet position thereof in the longitudinal direction is aligned, the leading end S2*b* of the second sheet S2 delivered out by the kick-out rollers 29 reaches the sheet contact position of the longitudinal alignment roller 33. Then, the longitudinal alignment roller 33 rotates the second time, comes into contact with the second sheet S2 at the sheet contact position to apply the conveyance force in the longitudinal alignment direction X1 thereto, and thus the second sheet S2 abuts the longitudinal alignment standard plates 39.

As described above, as a result of the offset amount k being larger than the distance k0, the longitudinal alignment roller 33 can be brought into contact with each of the plurality of superimposed sheets when aligning the sheets S1 and S2 superimposed in the buffering portion 4B by the longitudinal alignment roller 33. Although a case where two sheets are superimposed on each other in the buffering portion 4B has been described herein, a similar advantage can be achieved also in the case where three or more sheets are superimposed on one another as long as the offset amount k between two sheets vertically superimposed on each other is larger than the distance k0.

In contrast, if the offset amount k is equal to or smaller than the distance k0 from the longitudinal alignment roller 33 to the longitudinal alignment standard plates 39, there is a possibility that the sheet S2 superimposed on the sheet S1 reaches the sheet contact position of the longitudinal alignment roller 33 before the sheet S1 reaches the longitudinal alignment standard plates 39. In this case, for example, while the sheet S1 receives a frictional force from the intermediate lower guide 32, the conveyance force from the longitudinal alignment roller 33 is applied to the sheet S2, and thus the sheet S2 may slide on the sheet S1 and move in the longitudinal alignment direction X1 to pass the sheet S1. Then, when the sheet S2 reaches the longitudinal alignment standard plates 39 before the sheet S1, the conveyance force of the longitudinal alignment roller 33 is not transmitted to the sheet S1, and the sheet S1 stops at a position away from the longitudinal alignment standard plates 39. As a result, the alignment precision in the longitudinal alignment direction X1 is degraded.

To avoid such degradation of the alignment precision, increasing the contact pressure of the longitudinal alignment roller 33 on the sheet to increase the conveyance force applied to the sheet can be considered. However, in this case, the sheet becomes more likely to be crumpled between the longitudinal alignment roller 33 and the longitudinal alignment standard plates 39, which leads to occurrence of a jam in the binding processing portion 4A. Therefore, in the case where the offset amount k is equal to or smaller than the distance k0, it is sometimes difficult to maintain the alignment precision and suppress the jam at the same time.

In contrast, in the present exemplary embodiment, as a result of setting the offset amount k of the buffered sheets to a value larger than the distance k0 from the longitudinal alignment roller 33 to the longitudinal alignment standard plates 39, it is possible to bring the longitudinal alignment roller 33 into contact with each of the plurality of sheets. In addition, since the kick-out rollers 29 provided upstream of the longitudinal alignment roller 33 are a conveyance roller pair that nips and conveys a sheet, each sheet can be reliably delivered to the sheet contact position of the longitudinal alignment roller 33. As a result, even in conditions in which the conveyance force that the longitudinal alignment roller 33 applies to the sheet is relatively small and the possibility of occurrence of crumpling of the sheet is low, the plurality of superimposed sheets can be more reliably moved to the longitudinal alignment standard plates 39. Therefore, improvement in the precision of the alignment operation by the longitudinal alignment roller 33 and suppression of jam in the binding processing portion 4A can be achieved at the same time.

Particularly, in the post-processing apparatus 4 of the present exemplary embodiment connected to the image forming apparatus 1 having a high productivity, three or more sheets need to be superimposed on one another in the buffering portion 4B. In addition, since time that can be used for alignment operation of each buffered sheet, that is, time until the first sheet that is not to be subjected to the buffering operation reaches the binding processing portion 4A, is short in this case, the plurality of buffered sheets need to be quickly aligned. This technique is particularly effective because this technique can be used for suppressing the jam while maintaining the alignment precision in the case of performing the alignment operation in such difficult conditions.

To be noted, in the case where the distance k0 from the longitudinal alignment roller 33 to the longitudinal alignment standard plates 39 is 20 mm, the offset amount k of the buffered sheets is, for example, preferably about 35 mm. By setting the difference between the offset amount k and the distance k0 to an appropriate value, the possibility of the sheet S2 superimposed on the sheet S1 coming into contact with the longitudinal alignment roller 33 before the sheet S1 reaches the longitudinal alignment standard plates 39 can be reduced.

In addition, while the plurality of buffered sheets are aligned by the longitudinal alignment roller 33, although the kick-out rollers 29 may be temporarily stopped each time the longitudinal alignment roller 33 rotates once, the kick-out rollers 29 may be continuously rotated at the constant speed V2. In this case, synchronizing the time for the kick-out rollers 29 to move a sheet by the offset amount k at the speed V2 with the rotation interval of the longitudinal alignment roller 33 can be considered. In either case, the longitudinal alignment roller 33 can be brought into contact with each sheet by setting the longitudinal alignment roller 33 to rotate once each time one of the plurality of buffered sheets is conveyed to the sheet contact position of the longitudinal alignment roller 33 by the kick-out rollers 29.

Operation Sequence of Binding Processing Portion

Figure 16:
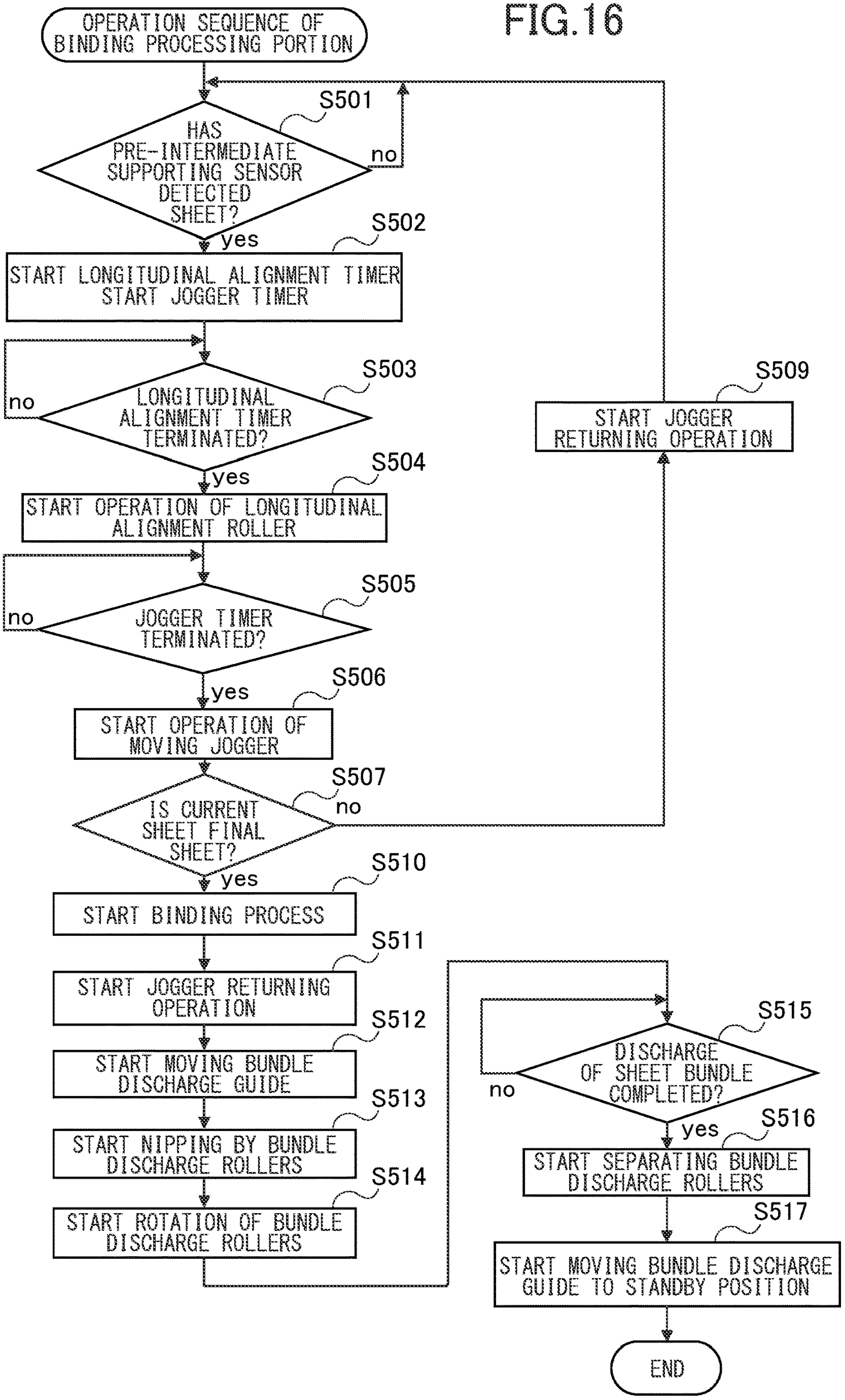
FIG. 16 is a flowchart illustrating an operation sequence of the binding processing portion according to the first exemplary embodiment.

The operation sequence of the binding processing portion that realizes the operation described above will be described with reference to a flowchart of FIG. 16. Each step of the flowchart is performed by the CPU 401 of the finisher controller 400 illustrated in FIG. 5 executing a program read out from the memory 402. In addition, this operation sequence is started when the finisher controller 400 receives a notification indicating that execution of an image formation job requesting a binding process by the binding processing portion 4A from the printer controller 100.

In step S501, a standby state is maintained while determining whether or not the pre-intermediate supporting sensor 38 has detected passage of a sheet in the in-body discharge path 82. When the pre-intermediate supporting sensor 38 has detected the sheet, in step S502, a longitudinal alignment timer and a jogger timer are set.

The termination time of the longitudinal alignment timer is set to a timing after the trailing end of the sheet in the longitudinal alignment direction X1 passes through the kick-out rollers 29. To be noted, in the case where the buffered sheets superimposed in the buffering portion 4B are current sheets, the termination time of the longitudinal alignment timer is set to a timing after the trailing end of the first sheet passes through the kick-out rollers 29.

The termination time of the jogger timer is set to a timing after the alignment operation by the longitudinal alignment roller 33 in step S504 is finished. In the case where buffered sheets superimposed in the buffering portion 4B are current sheets, the termination time of the jogger timer is set to a timing after the alignment operation by the longitudinal alignment roller 33 in step S504 is finished for all the buffered sheets.

In step S503, a standby state is maintained while counting down the longitudinal alignment timer. When the count down is finished, the longitudinal alignment roller 331 is rotated once in step S504, and thus the alignment operation in the longitudinal direction is started. In the case where the buffered sheets superimposed in the buffering portion 4B are current sheets, the longitudinal alignment roller 33 is repeatedly rotated the number of the buffered sheets. In step S505, a standby state is taken while counting down the jogger timer. When the countdown is finished, movement of the lateral alignment jogger 58 from the standby position toward the lateral alignment standard plate 52 is started in step S506, and thus the alignment operation in the lateral direction is started.

In step S507, whether or not the current sheet is the final sheet, that is, whether or not the current sheet is the sheet that the binding processing portion 4A receives lastly in the sheets constituting the sheet bundle is determined. In the case where the current sheet is not the final sheet, movement of the lateral alignment jogger 58 toward the standby position is started in step S509, and then the process returns to step S501 and processing described above is repeated. In the case where the current sheet is the final sheet, the process proceeds to step S510.

In step S510, the binding operation of the sheet bundle is performed by the stapler 51. In the case where the long side of the sheet bundle is to be bounded, a plurality of positions along the long side of the sheet bundle are stapled by the stapler 51 while moving the stapler 51 in the longitudinal alignment direction X1 or the bundle discharge direction X2 by the stapler moving motor M8.

When the binding process is finished, a returning operation of returning the lateral alignment jogger 58 to the standby position is started in step S511, and the bundle discharge guide 34 is moved in the bundle discharge direction X2 in step S512. When the leading end of the sheet bundle SB in the bundle discharge direction X2 has passed through the bundle discharge rollers 36 in a separate state, the bundle discharge guide 34 is temporarily stopped, and the upper roller **36*a* is moved downward in step S513 to nip the sheet bundle SB by the bundle discharge rollers 36. Then, rotation of the bundle discharge rollers 36 is started in step S514 to discharge the sheet bundle SB onto the lower discharge tray 37**.

After standing by in step S515 until the discharge of the sheet bundle SB is completed, the upper roller **36*a* is lifted in step S516 and thus the bundle discharge rollers 36 are separated from each other again. In addition, the bundle discharge guide 34 is moved in the longitudinal alignment direction X1 in step S517 and is thus returned to the standby position. When the bundle discharge guide 34** is returned to the standby position, the operation sequence is completed.

Second Exemplary Embodiment

Next, configurations of a sheet processing apparatus and an image forming system according to a second exemplary embodiment will be described. The present exemplary embodiment is different from the first exemplary embodiment in that a paddle-shaped rotary member is used as the moving member that comes into contact with one surface of a sheet and moves the sheet to align the sheet. Other elements having substantially the same configurations and functions as in the first exemplary embodiment will be denoted by the same reference signs as in the first exemplary embodiment and description thereof will be omitted.

Figure 17:
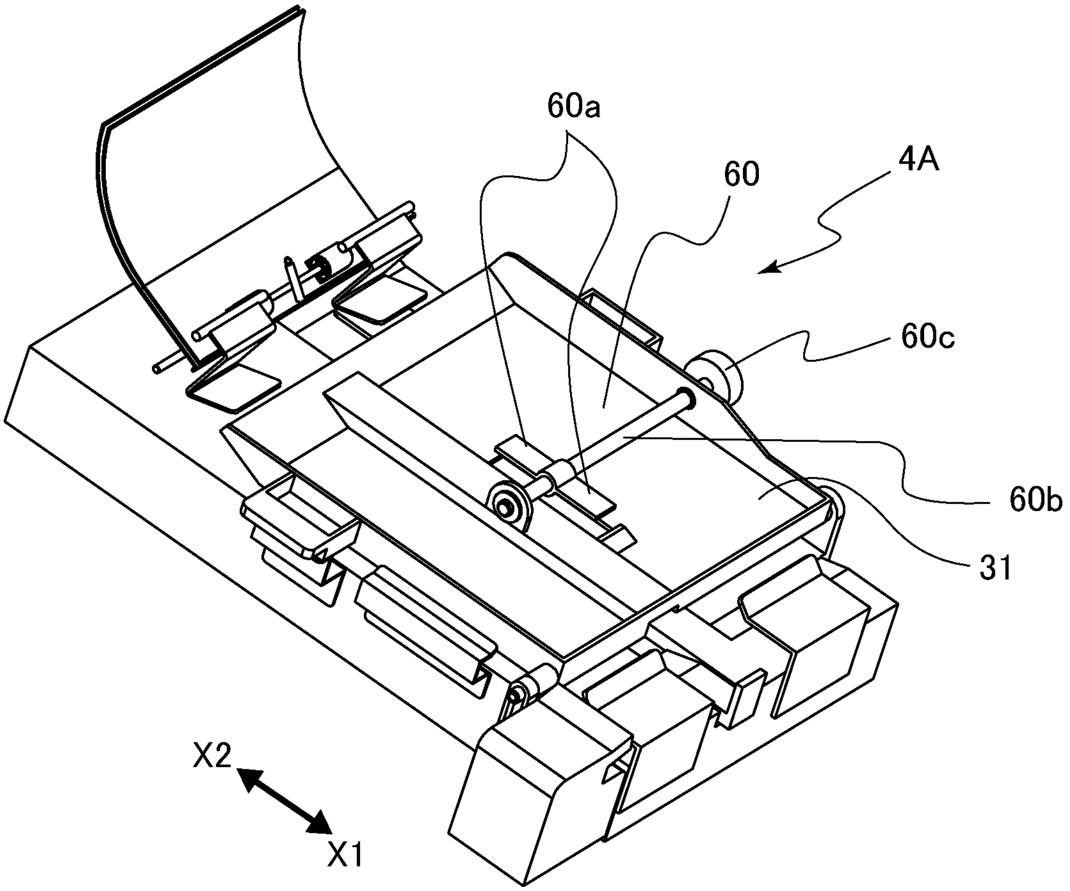
FIG. 17 is a perspective view of a binding processing portion according to a second exemplary embodiment.

As illustrated in FIG. 17, an alignment paddle 60 serving as a moving member of the present exemplary embodiment is provided in the binding processing portion 4A instead of the noncircular longitudinal alignment roller 33 used in the first exemplary embodiment. The alignment paddle 60 includes two paddle portions **60*a*, a shaft portion 60*b*, and a gear portion 60*c*. The paddle portions 60*a* are provided at positions symmetrical to each other in the peripheral direction with respect to the shaft portion 60*b*, that is, positions separated from each other by 180°, and each project outwardly in a radial direction from the shaft portion 60*b*. Each paddle portion 60*a* is a blade member formed from an elastic material such as rubber, and the alignment paddle 60 comes into contact with the sheet with the paddle portions 60*a*. To be noted, the sheet contact position of the alignment paddle 60 of the present exemplary embodiment is the axial center position of the shaft portion 60*b*** in the longitudinal alignment direction X1.

The shaft portion **60*b* is pivotably supported by the intermediate upper guide 31, and is driven to intermittently rotate by 180° at a time by a drive transmission device including the gear portion 60*c*. The drive source of the alignment paddle 60 is the longitudinal alignment motor M6 illustrated in FIG. 5** described in the first exemplary embodiment.

The operation sequence of the binding processing portion 4A including the alignment paddle 60 is the same as the operation sequence of the first exemplary embodiment described with reference to FIG. 16 except that the amount of rotation of the alignment paddle 60 in one alignment operation is 180°. Therefore, for the same reason as in the first exemplary embodiment, improvement of the alignment precision of the sheet and reduction of jam in the binding processing portion 4A can be achieved at the same time also according to the configuration of the present exemplary embodiment.

To be noted, since 180° is sufficient as the amount of rotation of the alignment paddle 60 in one alignment operation in the present exemplary embodiment, it is expected that the alignment paddle 60 shortens the interval between alignment operations and thus shortens the time required for the binding process.

Third Exemplary Embodiment

Next, configurations of a sheet processing apparatus and an image forming system according to a third exemplary embodiment will be described. The present exemplary embodiment is different from the first and second exemplary embodiments in that a roller member that can be lifted and lowered is used as the moving member that comes into contact with one surface of a sheet and moves the sheet to align the sheet. Other elements having substantially the same configurations and functions as in the first exemplary embodiment will be denoted by the same reference signs as in the first exemplary embodiment and description thereof will be omitted.

Figure 18:
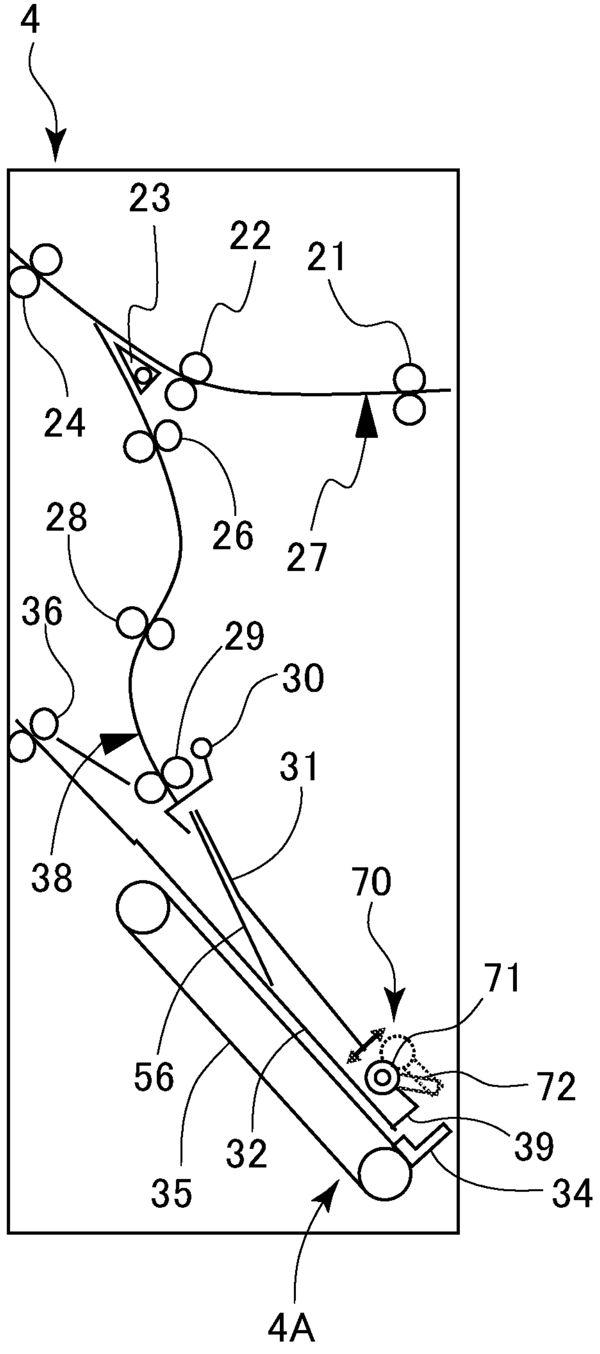
FIG. 18 is a schematic view of a sheet processing apparatus according to a third exemplary embodiment.

As illustrated in FIG. 18, an ascending/descending roller 70 serving as a moving member of the present exemplary embodiment is provided in the binding processing portion 4A instead of the noncircular longitudinal alignment roller 33 and the alignment paddle 60 used in the first and second exemplary embodiments. The ascending/descending roller 70 includes a roller body 71 having a columnar shape, and an ascending/descending arm 72 that rotatably supports the roller body 71. A drive source that rotates the roller body 71 is the longitudinal alignment motor M6 illustrated in FIG. 5 described in the first exemplary embodiment. In addition, the ascending/descending arm 72 is configured to swing downward by, for example, being pressed by a plunger solenoid, move the roller body 71 to a position where the roller body 71 comes into contact with the intermediate lower guide 32, and swing upward by being released from the pressurization of the plunger solenoid. In this configuration, the roller body 71 can be rotated in a rotation direction along the longitudinal alignment direction X1 for an arbitrary time in a state in which the roller body 71 is still in a lowered position. To be noted, the sheet contact position of the ascending/descending roller 70 in the present exemplary embodiment is the axial center of the roller body 71 when the ascending/descending roller 70 is lowered.

The operation sequence of the binding processing portion 4A including the ascending/descending roller 70 is the same as the operation sequence of the first exemplary embodiment described with reference to FIG. 16 except that the buffered sheets are handled by changing the length of a period in which the ascending/descending roller 70 performs the alignment operation. That is, in this case, the length of a period in which the roller body 71 is rotationally driven in a lowered state may be changed in accordance with the number of buffered sheets superimposed in the buffering portion 4B when operating the ascending/descending roller 70 in step S504 of FIG. 16. Therefore, for the same reason as in the first exemplary embodiment, improvement of the alignment precision of the sheet and reduction of jam in the binding processing portion 4A can be achieved at the same time also according to the configuration of the present exemplary embodiment.

To be noted, a cam mechanism that lifts or lowers the ascending/descending roller 70 each time the longitudinal alignment motor M6 rotates by a predetermined amount may be provided instead of the configuration in which a drive source that lifts and lowers the ascending/descending roller 70 is provided additionally to the longitudinal alignment motor M6. In the operation sequence of the binding processing portion 4A in this case, the buffered sheets are handled by changing the number of times of the alignment operation by the ascending/descending roller 70 similarly to the first and second exemplary embodiments.

First Modification Example

Figure 20:
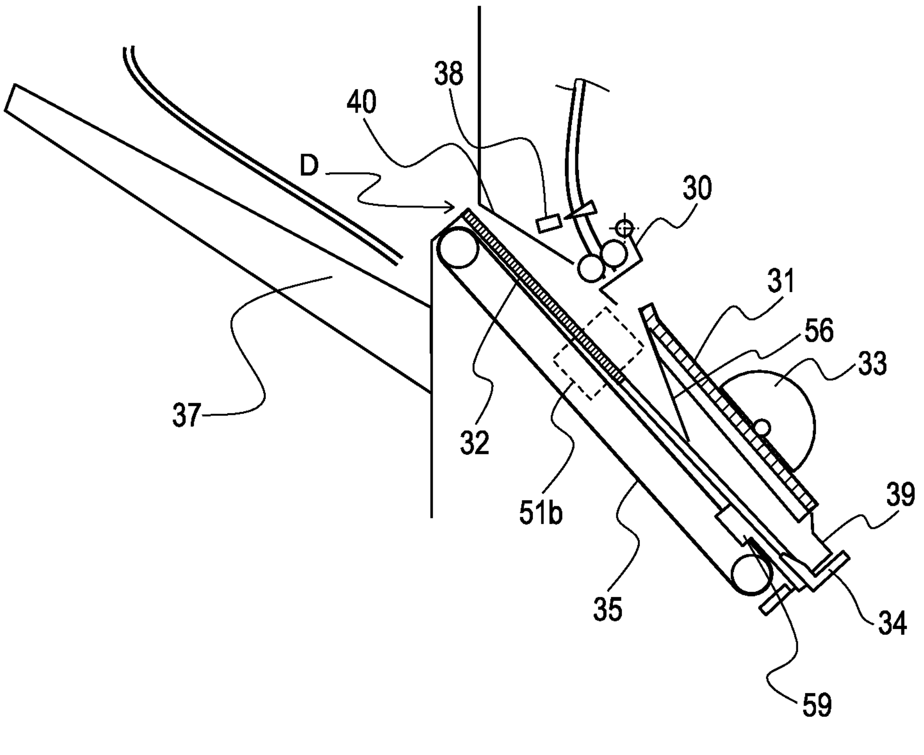
FIG. 20 is a section view of a first modification example.

In the first to third exemplary embodiments, a configuration of a first modification example illustrated in FIG. 20 may be employed. The first modification example is a configuration in which the bundle discharge rollers 36 are not provided, the entrance upper guide 40 is provided as a fixed guide, and the entrance upper guide 40 and the intermediate lower guide 32 constitute a discharge portion D for sheets. The bundle discharge guide 34 is capable of moving sheets to a position where the sheets can be discharged onto the lower discharge tray 37, and the sheets can be discharged onto the lower discharge tray 37 through the discharge portion D by the bundle discharge guide 34. The discharge portion D is a gap slightly wider than the maximum thickness of a sheet bundle that can be accumulated on the intermediate lower guide 32. This gap constitutes a blocking portion. In this case, the discharge portion D is provided at a position sufficiently away from the moving region of the stapler 51 in the bundle discharge direction X2.

Second Modification Example

Figure 21:
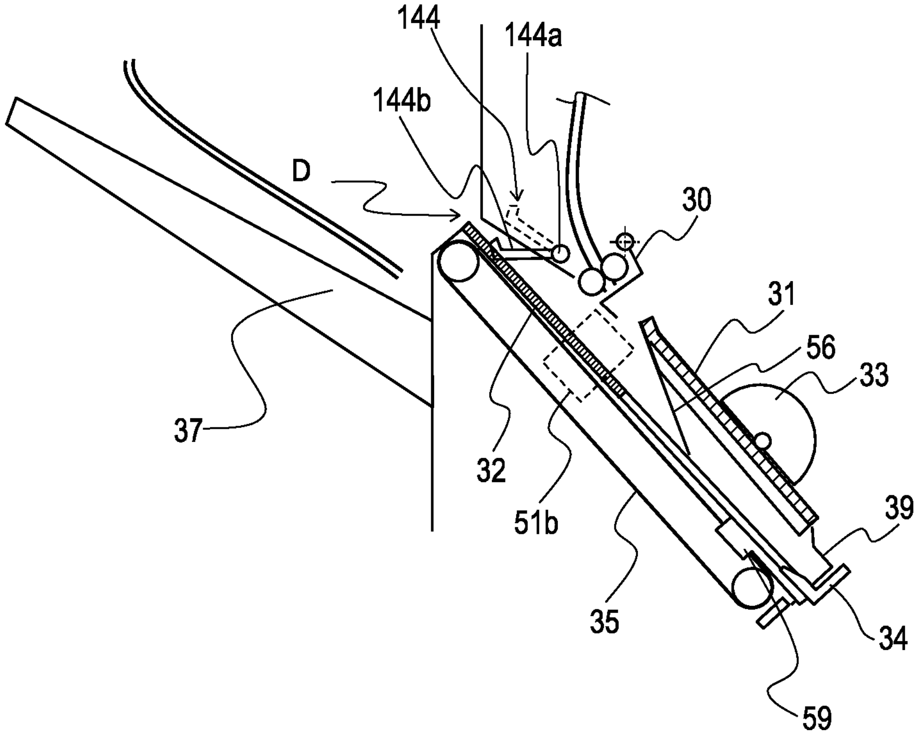
FIG. 21 is a section view of a second modification example.

In addition, a configuration of a second modification example illustrated by FIG. 21 may be employed. The second modification is a configuration in which a discharge flag 144 is provided as a blocking portion in the vicinity of the discharge portion D. The flag 144 is constituted by a rotation shaft 144*a* and a flag surface 144*b*. The flag 144 is rotatable about the rotation shaft 144*a*, and is positioned at a first position indicated by a solid line in FIG. 21 by an unillustrated stopper while being urged in a counterclockwise direction in FIG. 21 by the weight thereof or by an elastic member. Further, the flag 144 is configured to be rotatable in a clockwise direction to a second position indicated by a broken line. When discharging sheets from the intermediate supporting portion 142, the flag 144 is pushed by the leading end of the sheet and pivots to the second position from the first position, and thus a conveyance path is generated. Meanwhile, access to the sheets being aligned or to the stapler 51 from the outside of the discharge portion D can be suppressed by the flag 144.

Third Modification Example

Figure 22:
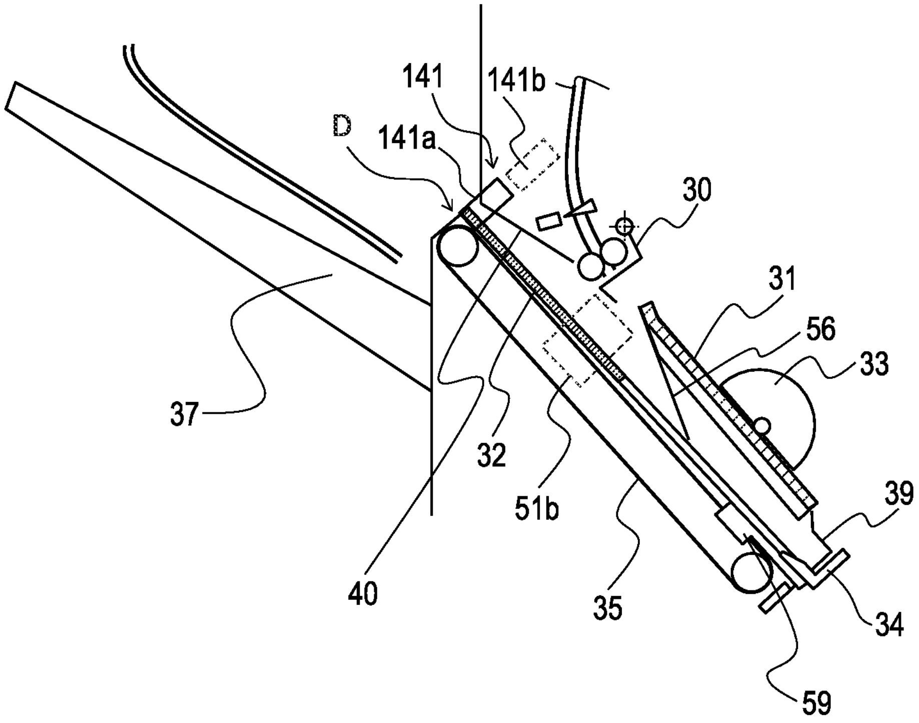
FIG. 22 is a section view of a third modification example.

In addition, a configuration of a third modification example illustrated in FIG. 22 may be employed. The third modification example is a configuration in which a shutter 141 that is an opening/closing member is provided as a blocking portion. The shutter 141 is positioned at such a position as to block the discharge portion D, that is, a position 141*a* of FIG. 22, by an unillustrated actuator during an alignment operation and a binding processing operation. In addition, the shutter 141 is retracted to such a position as to open the discharge portion D, that is, a position 141*b* of FIG. 22, by the actuator only when discharging the sheet bundle. By providing the shutter 141 in this manner, access to the sheets being aligned and to the stapler 51 can be suppressed.

Fourth Exemplary Embodiment

Next, configurations of a sheet processing apparatus and an image forming system according to a fourth exemplary embodiment will be described. The present exemplary embodiment is different from the first to third exemplary embodiments in that the trailing end of a sheet in the sheet conveyance direction serves as an alignment standard for aligning the sheet. Other elements having substantially the same configurations and functions as in the first to third exemplary embodiments will be denoted by the same reference signs as in the first to third exemplary embodiments and description thereof will be omitted.

Figure 23:
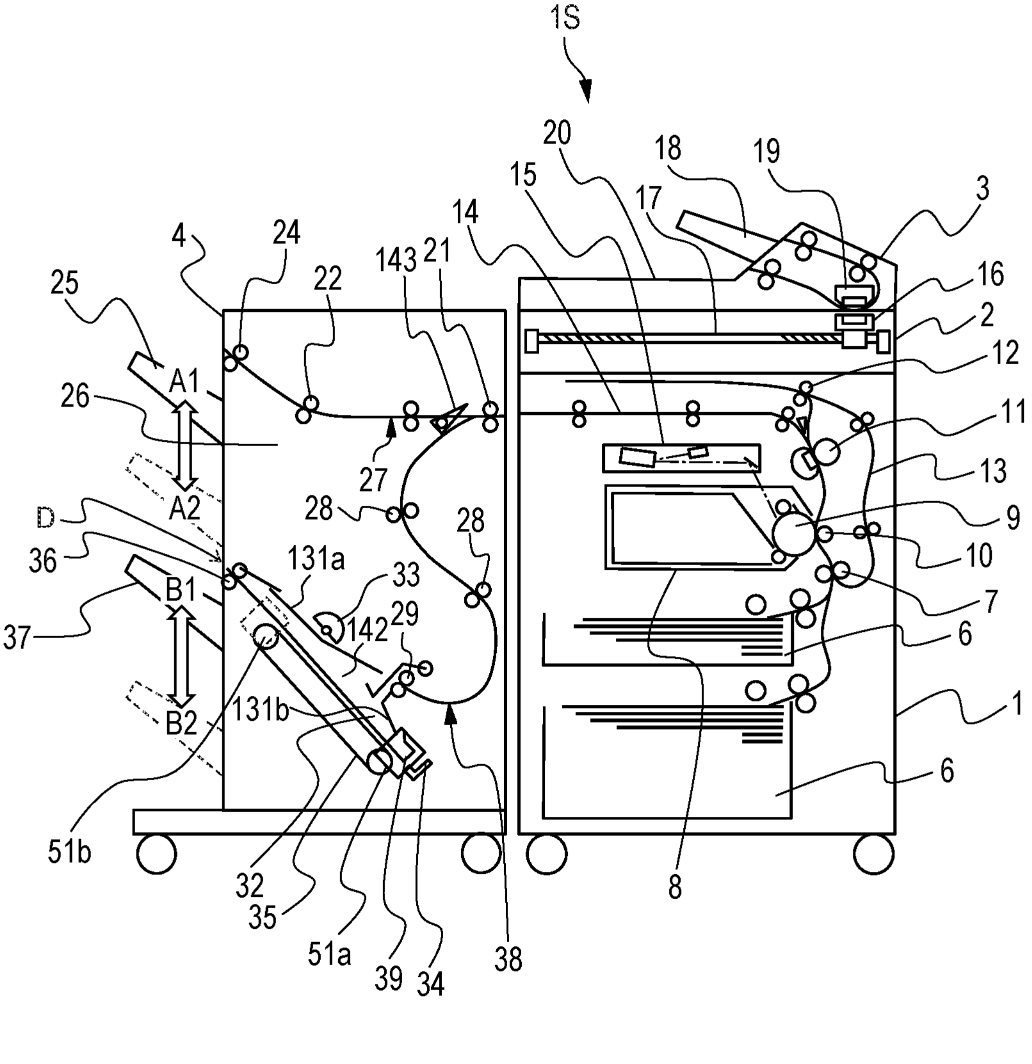
FIG. 23 is a schematic view of an image forming system according to a fourth exemplary embodiment.

FIG. 23 is a schematic section view of a sheet processing apparatus and an image forming system of the present exemplary embodiment for describing configurations thereof.

A sheet discharged from the horizontal conveyance portion 14 of the image forming apparatus 1 is received by the inlet rollers 21. The conveyance path that receives the sheet by the inlet rollers 21 corresponds to a first conveyance path of the present exemplary embodiment. A flap guide 143 that switches the conveyance path is provided downstream of the inlet rollers 21. The flap guide 143 can be switched, by an unillustrated actuator, between a position illustrated in FIG. 23 and a position to which the flap guide 143 is rotated in the clockwise direction from the position of FIG. 23, and thus the conveyance path of the sheet can be switched. When conveying the sheet to the upper discharge tray 25, the flap guide 143 is switched from the position illustrated in FIG. 23 to the position to which the flap guide 143 is rotated in the clockwise direction. The conveyance speed is controlled on the basis of the time when the trailing end of the sheet passes the entrance sensor 27, and the sheet is discharged onto the upper discharge tray 25.

In the case where the discharge destination of the sheet is the lower discharge tray 37, the flap guide 143 is held at the position illustrated in FIG. 23. The conveyed sheet is conveyed to the second conveyance path. The sheet is conveyed to the kick-out rollers 29 serving as a conveyance roller pair through the intermediate conveyance rollers 28 in the second conveyance path, and is conveyed to an intermediate supporting portion 142 constituted by the intermediate upper guide 31 and the intermediate lower guide 32. The longitudinal alignment standard plates 39 serving as regulating portions are disposed at the most upstream portion of the intermediate supporting portion 142, and a sheet bundle is aligned by causing the trailing end of the sheets in the conveyance direction to abut the longitudinal alignment standard plates 39.

In addition, the longitudinal alignment roller 33 for pushing a sheet released from the kick-out rollers 29 against the longitudinal alignment standard plates 39 is rotatably supported by a first intermediate supporting upper guide 131*a*. After the trailing end of the sheet passes the pre-intermediate supporting sensor 38, the longitudinal alignment roller 33 conveys the sheet toward the longitudinal alignment standard plates 39 at a predetermined timing.

In addition, a bundle pressing flag 30 for pushing down the trailing end of the sheet such that the trailing end of the sheet is reliably introduced to a space below a second intermediate supporting upper guide 131*b* is rotatably supported at a position downstream of the kick-out rollers 29.

After sheets reach the longitudinal alignment standard plates 39, an unillustrated lateral alignment jogger performs the alignment operation with an unillustrated lateral alignment standard plate to align the sheet bundle. After alignment of a predetermined number of sheets is finished, the binding process is performed by the stapler 51. The stapler 51 can be moved by an unillustrated actuator and a moving mechanism along the sheet conveyance direction. The stapler 51 can move between a position 51*a* indicated by a solid line and a position 51*b* indicated by a broken line in FIG. 23.

The sheet bundle whose binding process has been completed is discharged to the outside of the post-processing apparatus 4 through the discharge portion D by the bundle discharge rollers 36, and is supported on the lower discharge tray 37. Similarly to the first to third exemplary embodiments, the movement region of the stapler 51 is provided upstream of the bundle discharge rollers 36 of the post-processing apparatus 4 in the discharge direction of the sheet bundle. According to this configuration, since no structure such as the stapler 51 or the driving mechanism for the stapler 51 is present in the space above the lower discharge tray 37, sheets supported on the lower discharge tray 37 can be easily picked up. In addition, the user or the sheets picked up by the user erroneously touching the sheets being aligned or the stapler 51 can be suppressed.

To be noted, although the bundle discharge rollers 36 also serve as a blocking portion that hinders entrance of an object from the outside to the inside of the post-processing apparatus 4 in the example illustrated in FIG. 23, other blocking portions exemplified in the first to third modification examples may be provided. In addition, the operation and the like of the lower discharge tray 37 are the same as in the first to third exemplary embodiments. To be noted, in the fourth exemplary embodiment, the discharge direction is the same as the conveyance direction of the kick-out rollers 29.

Also according to the configuration of the fourth exemplary embodiment in which the trailing end in the sheet conveyance direction serves as the alignment standard, merits equivalent to the merits described in the first to third exemplary embodiments and the first to third modification examples can be obtained.

Other Embodiments

In the first to fourth exemplary embodiments, the post-processing apparatus 4 directly connected to the image forming apparatus 1 has been described as an example of a sheet processing apparatus. However, the present technique is also applicable to a sheet processing apparatus that receives a sheet from the image forming apparatus 1 via an intermediate unit, for example, a relay conveyance unit mounted in a discharge space of an image forming apparatus of an in-body discharge type. In addition, examples of an image forming system including a sheet processing apparatus and an image forming apparatus include a system in which modules having functions of the image forming apparatus 1 and the post-processing apparatus 4 are incorporated in a single casing.

In addition, the stapler 51 is an example of a processing unit that processes a sheet, and may, for example, discharge the sheet bundle aligned in the intermediate supporting portion onto the lower discharge tray 37 without binding the sheet bundle. In addition, the post-processing apparatus 4 of the exemplary embodiments described above has been shown as an example of a sheet conveyance apparatus that conveys a sheet, and the present technique is also applicable to a sheet conveyance apparatus other than a sheet processing apparatus that processes a sheet or a recording material on which an image has been formed by an image forming apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-102796, filed on May 31, 2019, 2019-224719, filed on Dec. 12, 2019, and 2020-051914, filed on Mar. 23, 2020, which are hereby incorporated by reference herein in their entirety.

What is claimed is:

1. A sheet processing apparatus comprising:
- a first conveyance path through which a sheet is conveyed;
- a reverse roller pair configured to convey the sheet conveyed from the first conveyance path in a first direction and reverse the sheet toward a second direction opposite to the first direction;
- a second conveyance path through which the sheet reversed by the reverse roller pair is conveyed in the second direction;
- a conveyance roller pair disposed in the second conveyance path and configured to nip and convey the sheet in the second direction;
- a supporting portion which is positioned downstream of the conveyance roller pair in the second direction and on which the sheet discharged in the second direction from the second conveyance path by the conveyance roller pair is supported;
- a regulator configured to come into contact with a leading edge of the sheet in the second direction to regulate a position of the sheet on the supporting portion;
- a sheet processor configured to process the sheet supported on the supporting portion and move in a direction along the second direction;
- a discharge portion through which the sheet processed by the sheet processor is discharged out of the sheet processing apparatus;
- a third conveyance path extending from the supporting portion toward the discharge portion; and
- a guide configured to move in a third direction to push the leading edge of the sheet from the supporting portion toward the discharge portion through the third conveyance path, the third direction being opposite to a direction in which the leading edge of the sheet approaches the regulator when the sheet is discharged in the second direction by the conveyance roller pair,
- wherein the discharge portion is positioned downstream of a movement region of the sheet processor in the third direction, and
- wherein the sheet processor is a stapler configured to staple a plurality of sheets stacked on the supporting portion to form a sheet bundle.

2. The sheet processing apparatus according to claim 1,
- wherein the discharge portion is an opening portion through which the sheet is discharged from an inside to an outside of the sheet processing apparatus.

3. The sheet processing apparatus according to claim 1,
- wherein the supporting portion is configured such that a plurality of sheets are stacked thereon in a posture that a long side of each sheet is parallel to the third direction, and
- wherein the movement region of the stapler is set such that the stapler can staple the plurality of sheets at a plurality of positions in the third direction while moving along the long side.

4. The sheet processing apparatus according to claim 1, further comprising:
- a discharge roller pair configured to nip and discharge the sheet from an inside to an outside of the sheet processing apparatus through the discharge portion, the discharge roller pair configured to be switched between a separated state in which the discharge roller pair is separated from each other and a nipping state in which the discharge roller pair is abutted with each other to nip the sheet; and
- a controller configured to control the guide and the discharge roller pair such that (i) the guide pushes the sheet toward the discharge portion with the discharge roller pair in the separated state, (ii) the guide stops moving and the discharge roller pair is switched from the separated state to the nipping state in a case where a leading end of the sheet in the third direction reaches the discharge roller pair, and (iii) the discharge roller pair starts to discharge the sheet to the outside of the sheet processing apparatus,
- wherein the sheet processor is arranged on a first end side of the supporting portion in a sheet width direction orthogonal to the third direction, and the guide is arranged between the first end side and a second end side of the supporting portion opposite to the first end side in the sheet width direction.

5. The sheet processing apparatus according to claim 4,
- wherein the regulator includes a first part and a second part which are arranged separately from each other in the sheet width direction, and
- wherein the guide is arranged between the first part and the second part in the sheet width direction and is movable relative to the first part and the second part along the third direction.

6. The sheet processing apparatus according to claim 4, further comprising:
- a conveyor configured to convey the sheet supported on the supporting portion toward the regulator to abut the sheet with the regulator;
- an abutting portion disposed on the first end side of the supporting portion in the sheet width direction; and
- an alignment member disposed on the second end side of the supporting portion in the sheet width direction, movable in the sheet width direction, and configured to align the sheet supported on the supporting portion by pushing the sheet and abutting the sheet with the abutting portion,
- wherein the conveyor is arranged between the abutting portion and the alignment member in the sheet width direction, and the guide is arranged between the abutting portion and the conveyor in the sheet width direction.

7. The sheet processing apparatus according to claim 4,
- wherein after the guide stops moving, the guide is configured to start moving in the discharging direction again when the discharge roller pair starts to discharge the sheet to the outside of the sheet processing apparatus.

8. The sheet processing apparatus according to claim 1, further comprising:
- a discharge roller pair configured to nip and discharge the sheet from an inside to an outside of the sheet processing apparatus through the discharge portion,
- wherein the movement region of the sheet processor is located on an inner side of the sheet processing apparatus with respect to the discharge roller pair.

9. The sheet processing apparatus according to claim 1, further comprising:

a roller provided downstream of the conveyance roller pair in the second direction, movable upward and downward with respect to the supporting portion and configured to come into contact with an upper surface of the sheet discharged onto the supporting portion in the second direction to move the sheet further in the second direction and abut the leading edge of the sheet against the regulator.

10. A sheet processing apparatus comprising:

a first conveyance path through which a sheet is conveyed;

a reverse roller pair configured to convey the sheet conveyed from the first conveyance path in a first direction and reverse the sheet toward a second direction opposite to the first direction;

a second conveyance path through which the sheet reversed by the reverse roller pair is conveyed in the second direction;

a conveyance roller pair disposed in the second conveyance path and configured to nip and convey the sheet in the second direction;

a supporting portion which is positioned downstream of the conveyance roller pair in the second direction and on which the sheet discharged in the second direction from the second conveyance path by the conveyance roller pair is supported;

a regulator configured to come into contact with a leading edge of the sheet in the second direction to regulate a position of the sheet on the supporting portion;

a sheet processor configured to process the sheet supported on the supporting portion and move in a direction along the second direction;

a discharge portion through which the sheet processed by the sheet processor is discharged out of the sheet processing apparatus;

a third conveyance path extending from the supporting portion toward the discharge portion; and a guide configured to move in a third direction to push the leading edge of the sheet from the supporting portion toward the discharge portion through the third conveyance path, the third direction being opposite to a direction in which the leading edge of the sheet approaches the regulator when the sheet is discharged in the second direction by the conveyance roller pair, wherein the discharge portion is positioned downstream of a movement region of the sheet processor in the third direction; and a discharge roller pair configured to nip and discharge the sheet from an inside to an outside of the sheet processing apparatus through the discharge portion, wherein the movement region of the sheet processor is located on an inner side of the sheet processing apparatus with respect to the discharge roller pair.

11. A sheet processing apparatus comprising:

a first conveyance path through which a sheet is conveyed;

a reverse roller pair configured to convey the sheet conveyed from the first conveyance path in a first direction and reverse the sheet toward a second direction opposite to the first direction;

a second conveyance path through which the sheet reversed by the reverse roller pair is conveyed in the second direction;

a conveyance roller pair disposed in the second conveyance path and configured to nip and convey the sheet in the second direction;

a supporting portion which is positioned downstream of the conveyance roller pair in the second direction and on which the sheet discharged in the second direction from the second conveyance path by the conveyance roller pair is supported;

a regulator configured to come into contact with a leading edge of the sheet in the second direction to regulate a position of the sheet on the supporting portion;

a sheet processor configured to process the sheet supported on the supporting portion and move in a direction along the second direction;

a discharge portion through which the sheet processed by the sheet processor is discharged out of the sheet processing apparatus;

a third conveyance path extending from the supporting portion toward the discharge portion; and a guide configured to move in a third direction to push the leading edge of the sheet from the supporting portion toward the discharge portion through the third conveyance path, the third direction being opposite to a direction in which the leading edge of the sheet approaches the regulator when the sheet is discharged in the second direction by the conveyance roller pair, wherein the discharge portion is positioned downstream of a movement region of the sheet processor in the third direction; and a roller provided downstream of the conveyance roller pair in the second direction, movable upward and downward with respect to the supporting portion and configured to come into contact with an upper surface of the sheet discharged onto the supporting portion in the second direction to move the sheet further in the second direction and abut the leading edge of the sheet against the regulator.

* * * * *